United States Patent
Sánchez De La Fuente et al.

(10) Patent No.: US 12,262,027 B2
(45) Date of Patent: Mar. 25, 2025

(54) PROCESSING OF OUTPUT LAYER SETS OF CODED VIDEO

(71) Applicant: FRAUNHOFER-GESELLSCHAFT ZUR FÖRDERUNG DER ANGEWANDTEN FORSCHUNG E.V., Munich (DE)

(72) Inventors: Yago Sánchez De La Fuente, Berlin (DE); Karsten Sühring, Berlin (DE); Cornelius Hellge, Berlin (DE); Thomas Schierl, Berlin (DE); Robert Skupin, Berlin (DE); Thomas Wiegand, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 52 days.

(21) Appl. No.: 17/926,247

(22) PCT Filed: May 20, 2021

(86) PCT No.: PCT/EP2021/063552
§ 371 (c)(1),
(2) Date: Nov. 18, 2022

(87) PCT Pub. No.: WO2021/234124
PCT Pub. Date: Nov. 25, 2021

(65) Prior Publication Data
US 2023/0224479 A1    Jul. 13, 2023

(30) Foreign Application Priority Data
May 22, 2020 (EP) .................... 20176207

(51) Int. Cl.
*H04N 19/184* (2014.01)
*H04N 19/30* (2014.01)

(52) U.S. Cl.
CPC .......... *H04N 19/184* (2014.11); *H04N 19/30* (2014.11)

(58) Field of Classification Search
CPC ........................... H04N 19/184; H04N 19/30
See application file for complete search history.

(56) References Cited

U.S. PATENT DOCUMENTS

| 11,870,979 B2 * | 1/2024 | Deng | ................... H04N 19/184 |
| 2015/0156501 A1 | 6/2015 | Hannuksela | |
| 2016/0191931 A1* | 6/2016 | Hannuksela | ......... H04N 19/136 375/240.12 |

OTHER PUBLICATIONS

International Search Report for PCT/EP2021/063552, mailed Aug. 3, 2021, 6 pages.

(Continued)

*Primary Examiner* — Jae N Noh
(74) *Attorney, Agent, or Firm* — NIXON & VANDERHYE P.C.

(57) ABSTRACT

An output layer set may describe a video bitstream, or video sequence, which is extractable from a multi-layered video bitstream. Concepts related to output layer sets are described, including a concept for a random-accessible sub-bitstream indication, a concept for handling reference picture alignment, a concept for a bitstream-based OLS determination, a concept for sequence start access units of an extracted video bitstream, a concept for handling temporal sublayers in the extraction process of an output layer set, a concept for handling temporal sublayers in video parameter signaling and a concept for output layer selection in region of interest applications.

19 Claims, 14 Drawing Sheets

(56) References Cited

OTHER PUBLICATIONS

Figure 1:
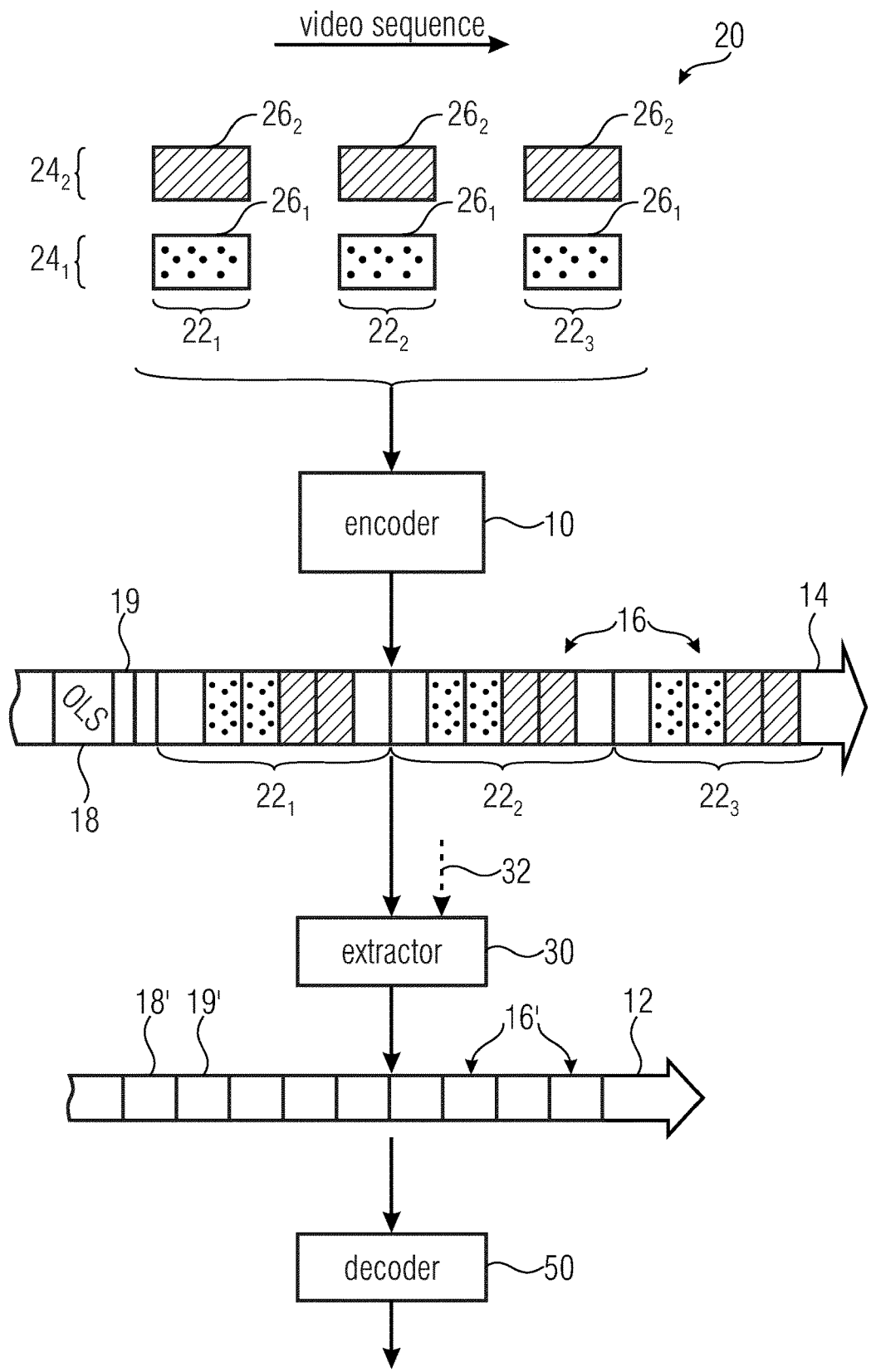

Written Opinion of the ISA for PCT/EP2021/063552, mailed Aug. 3, 2021, 10 pages.
He et al., "AHG9: On sub-bitstream extraction", Joint Video Experts Team (JVET) of ITU-T SG 16 WP 3 and ISO/IEC JTC/ 1/SC 29/WG 11, 18$^{th}$ Meeting Apr. 15-24, 2020, Document: JVET-R0264, Apr. 3, 2020, 2 pages.
Ramasubramonian et al., "MV-HEVC/SHVC HLS: Cross-layer non-alignment of IRAP pictures", Joint Collaborative Team on Video Coding (JCT-VC) of ITU-T SG 16 WP 3 and ISO/IEC JTC 1/SC 29/WG 11, 14$^{th}$ Meeting Jul. 25-Aug. 2, 2013, Document: JCTVC-N0090, Jul. 16, 2013, 4 pages.
Wang et al., "AHG9: On cross-layer alignments in HEVC 3DV and scalable extensions", Joint Collaborative Team on Video Coding (JCT-VC) of ITU-T SG 16 WP 3 and ISO/IEC JTC 1/SC 29/WG11, 13$^{th}$ Meeting, Apr. 18-26, 2013, Document: JCTVC-M0266_V2, Apr. 21, 2013, 6 pages.
Sanchez et al., "AHG9: On OLS and sublayers", Joint Video Experts Team (JVET) 0f ITU-T SG 16 WP 3 and ISO/IEC JTC 1/SC 29/WG 11, 19$^{th}$ Meeting, Jun. 22-Jul. 1, 2020, Document: JVET-80100, May 22, 2020, 5 pages.
B. Bross et al, "Versatile Video Coding (Draft 9)" Joint Video Experts Team (JVET) of ITU-T SG 16 WP 3 and ISO/IEC JTC 1/SC29/WG11, JVET-R2001-vA, 13 pages.

\* cited by examiner

PROCESSING OF OUTPUT LAYER SETS OF CODED VIDEO

This application is the U.S. national phase of International Application No. PCT/EP2021/063552 filed May 20, 2021, which designated the U.S. and claims priority to EP Patent Application No. 20176207.7 filed May 22, 2020, the entire contents of each of which are hereby incorporated by reference.

Embodiments of the present invention relate to apparatuses for encoding a video into a video bitstream, apparatuses for decoding a video bitstream, and apparatuses for handling a video bitstream, e.g. extracting a bitstream such as a sub-bitstream from a video bitstream. Further embodiments relate to methods for encoding, methods for decoding, methods for handling (e.g. methods for extracting), a video bitstream. Further embodiments relate to video bitstreams.

Layered coding for temporal, fidelity and spatial scalability is envisioned to be supported in the emerging VVC codec from the start, i.e. the coded video bitstream structured into so-called layers and (temporal) sub-layers and the coded picture data corresponding to a time instant, i.e. a so-called access unit (AU) may contain pictures within each layer that can predict from each other and of which some are output after decoding. A so-called output layer set (OLS) concept indicates to a decoder the referencing relationship and which layers are to be output when a bitstream is decoded. The OLS may also be utilized to identify the corresponding HRD-related timing/buffer information in the form of Buffering Period, Picture Timing and Decoding Unit Information SEI messages carried in the bitstream encapsulated in so called scalable-nesting SEI messages.

It is desirable to have concepts for handling output layer sets allowing for an extraction of a sub-bitstream from a video bitstream, which concepts provide an improved tradeoff between a precise definition of the extractable sub-bitstreams by the output layer set (in terms of precisely describing which portions of the video bitstream are to be extracted), an efficient exploitation of decoder resources (e.g., in terms of avoiding an extraction of portions which are unnecessary for decoding the selected sub-bitstream, or in terms of providing for a precise information about decoder settings or requirements for decoding the selected sub-bitstream), and a small signaling overhead.

A first aspect according to the invention provides for a concept for indicating, extracting and/or decoding from a mufti-layered video bitstream, a random accessible sub-bitstream. According to the first aspect, the extracted random accessible sub-bitstream selectively comprises, out of the bitstream portions of access units of the multi-layered video bitstream, bitstream portions associated with output layers of the random accessible sub-bitstream as indicated by an output layer set indication for the random accessible sub-bitstream or bitstream portions required for decoding random accessible bitstream portions of output layers.

A second aspect of the invention provides a concept for a multi-layered video bitstream having multiple layers and multiple temporal layers. The multi-layered video bitstream comprises an indication for an output layer set including one or more layers of the multi-layered video bitstream, and a reference layer indication which is indicative of inter-layer references of the layers of the output layer set. The multi-layered video bitstream comprises an indication, e.g. a temporal layer indication or a temporal in-layer indication, which allows for identifying, in combination with the manner in which the multi-layered video bitstream is encoded, the bitstream portions of the layers of the output layer set which belong to the output layer set. The concept allows for identifying the bitstream portions of the OLS by means of their bitstream portion type and/or by means of dependencies between the layers of the OLS as indicated by the reference layer indication. Thus, embodiments of the second aspect allow for a precise extraction of a sub-bitstream while avoiding an unnecessarily high signaling overhead.

A third aspect of the invention provides a concept which allows a decoder for decoding a video bitstream to determine an output layer set to be decoded on the basis of attributes of the video bitstream provided to the decoder. Thus, the concept allows the decoder to select an OLS also in absence of an instruction to the decoder which OLS to decode. The decoder being able to select an OLS in the absence of an instruction may ensure that the bitstream decoded by the decoder fulfills level requirements which are known to the decoder, e.g. by an indication in the video bitstream.

A fourth aspect of the invention provides a concept for an extraction of a sub-bitstream out of a multi-layered video data stream so that within the extracted sub-bitstream access units which exclusively comprise pictures or bitstream portions of one, e.g. the same, out of a set of predetermined bitstream portion types or picture types, e.g. bitstream portion types or picture types which are random accessible or independently coded, are indicated by means of a sequence start indicator, even in cases in which the respective access units are no sequence start access units in the original multi-layered video bitstream from which the sub-bitstream is extracted. Accordingly, a frequency of sequence start access units in the sub-bitstream may be higher than in the multi-layered video data stream, and accordingly, a decoder may benefit by having more sequence start access units available, avoiding an unnecessarily long waiting period until a decoding of the video sequence can start.

A fifth aspect of the invention provide a concept which allows for an extraction of a sub-bitstream from a multi-layered video bitstream so that the sub-bitstream exclusively comprises pictures which belong to one or more temporal sublayers which are associated with an output layer set which is descriptive of the sub-bitstream to be extracted. To this end, a syntax element in the multi-layered video bitstream is used which indicates a predetermined temporal sublayer for an OLS in a manner discriminating between different states including a state according to which the predetermined temporal sublayer is beneath a maximum of temporal sublayers within access units of which a picture of at least one of the subsets of layers is. Avoiding to forward unnecessary sublayers of the multi-layered video bitstream may decrease the size of the sub-bitstream and may decrease requirements for a decoder to decode the sub-bitstream.

According to embodiments, decoder capability-related parameters for the sub-bitstream exclusively comprising pictures of temporal sublayers belonging to the OLS which is descriptive of the sub-bitstream are signaled in the sub-bitstream and/or in the multi-layered video data stream. Thus, decoder capabilities may be exploited efficiently as pictures which do not belong to the OLS may be omitted in the determination of the decoder-related capability parameters.

A sixth aspect of the invention provides a concept for handling temporal sublayers in a signaling of video parameters for an output layer set of a multi-layered video bitstream. According to embodiments, the OLS is associated with one of one or more bitstream conformance sets, one of one or more buffer requirement sets, and one of one or more decoder requirement sets signaled in the video bitstream, wherein each of the bitstream conformance sets, the buffer requirement sets, and the decoder requirement sets are valid for one or more temporal sublayers indicated by a constraint on a maximum temporal sublayer (e.g. of hierarchically ordered temporal sublayers). Embodiments provide concepts for the relationship between the bitstream conformance set, the buffer requirement set, and the decoder requirement set associated with an OLS with respect to the maximum temporal sublayer to which they are associated, thus allowing a decoder to easily determine the parameters for the OLS, which parameters are associated with the bitstream conformance set, the buffer requirement set, and the decoder requirement set. For example, embodiments may allow the decoder to conclude that the parameters given in the bitstream conformance set, the buffer requirement set, and the decoder requirement set for the OLS are valid for the OLS completely. Other embodiments allow the decoder to conclude to which extent the parameters given in the bitstream conformance set, the buffer requirement set, and the decoder requirement set for the OLS are valid for the OLS.

According to embodiments, the maximum temporal sublayer indicated by the decoder requirement set associated with the OLS is smaller than or equal to the maximum temporal sublayer indicated by each of the buffer requirement set and the bitstream conformance set associated with the OLS, and the parameters within the buffer requirement set and the bitstream conformance set are valid for the OLS only as far as same relate to temporal layers equal to and beneath the maximum temporal sublayer indicated by the decoder requirement set associated with the OLS. Consequently, if the maximum temporal sublayer indicated by the decoder requirement set associated with the OLS is smaller than or equal to the maximum temporal sublayer indicated by each of the buffer requirement set and the bitstream conformance set associated with the OLS, the decoder may infer that the parameters of the of the buffer requirement set and the bitstream conformance set associated with the OLS are valid for the OLS only as far as same relate to temporal layers equal to and beneath the maximum temporal sublayer indicated by the decoder requirement set associated with the OLS. Hence, embodiments may enable the decoder to determine the video parameters for the OLS on the basis of the indication on the constraints on the maximum temporal sublayer signaled for the respective sets of parameters, so that a complicated analysis of the OLS and the video parameters may be avoided. Additionally, as the concept allows for an association of an OLS with a buffer requirement set and a bitstream conformance set, the constraints on the maximum temporal sublayer of which are greater than the one for the decoder requirement set associated to the OLS, signaling of a dedicated buffer requirement set and a dedicated bitstream conformance set relating to the same maximum temporal sublayer as the decoder requirement set may be omitted, reducing the signaling overhead for the video parameter set.

A seventh aspect of the invention provides a concept for handling a loss of a picture, e.g. due to a bitstream error or transmission loss, of a multi-layered video bitstream, the picture being encoded using inter-layer prediction. In case of a loss of a picture, which is part of a first layer, the picture may be replaced by a further picture of a second layer, the pictures of the second layer being used for inter-layer predicting pictures of the first layer. The concept includes to replace the picture with the further picture in dependence on a coincidence of a scaling window defined for the picture with a picture boundary of the picture and a coincidence of a scaling window defined for the further picture with the picture boundary of the further picture. In case of a coincidence of the scaling window defined for the picture with the picture boundary of the picture and a coincidence of the scaling window defined for the further picture with the picture boundary of the further picture, a substitution of the picture with the further picture may, for example, not result in a change of the display window of the presented content, e.g. change from detail view to overview.

Figure 2:
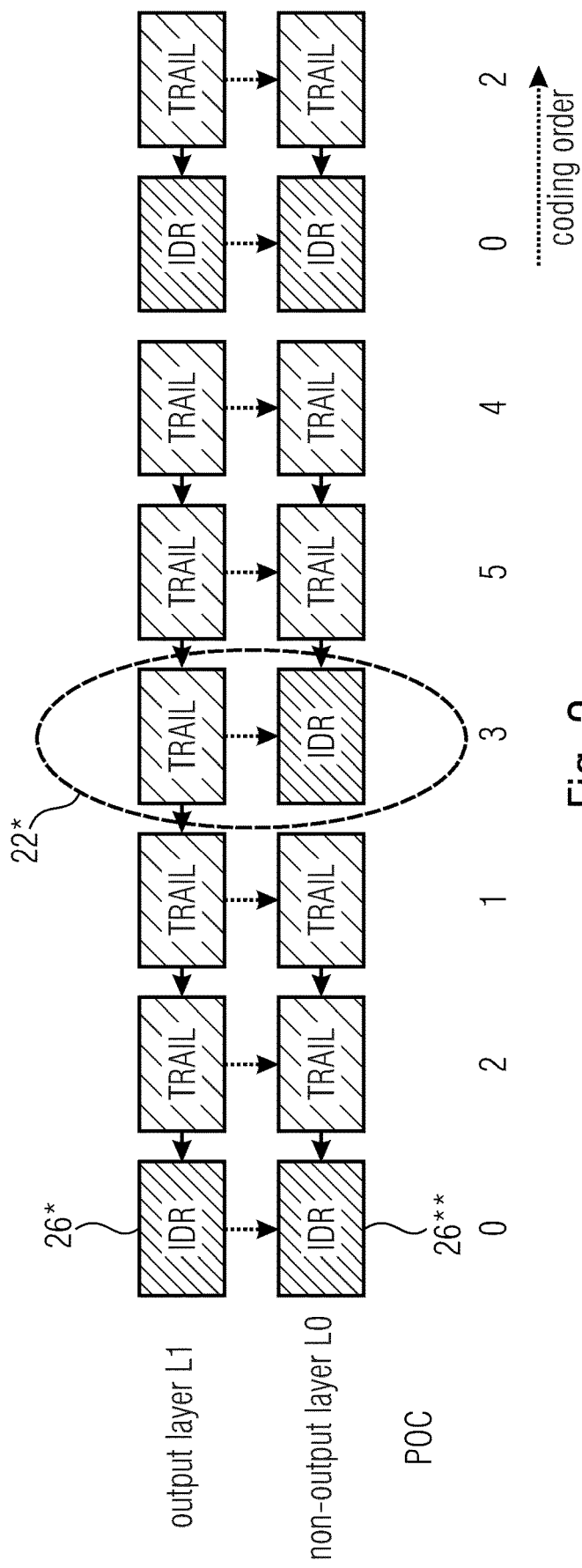
Figure 3:
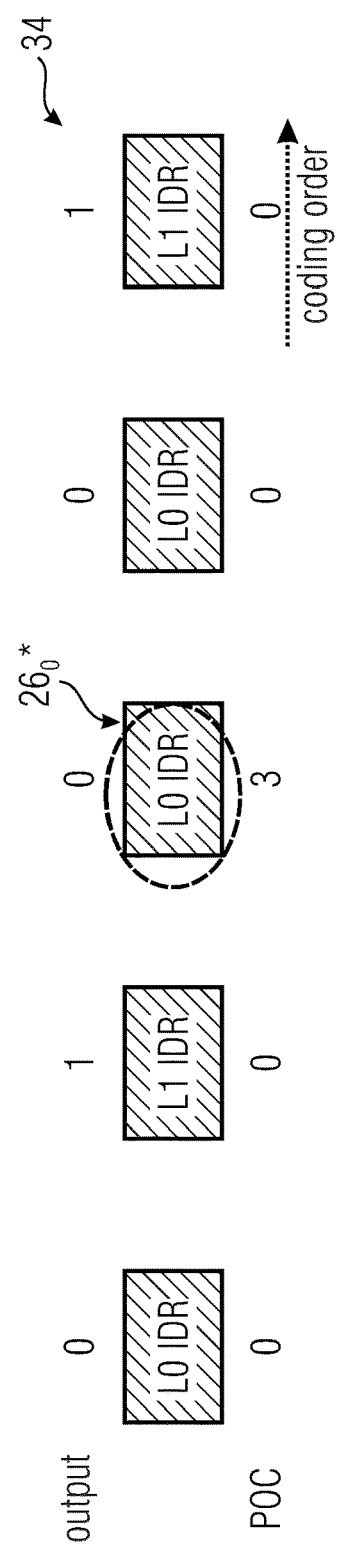
Figure 4:
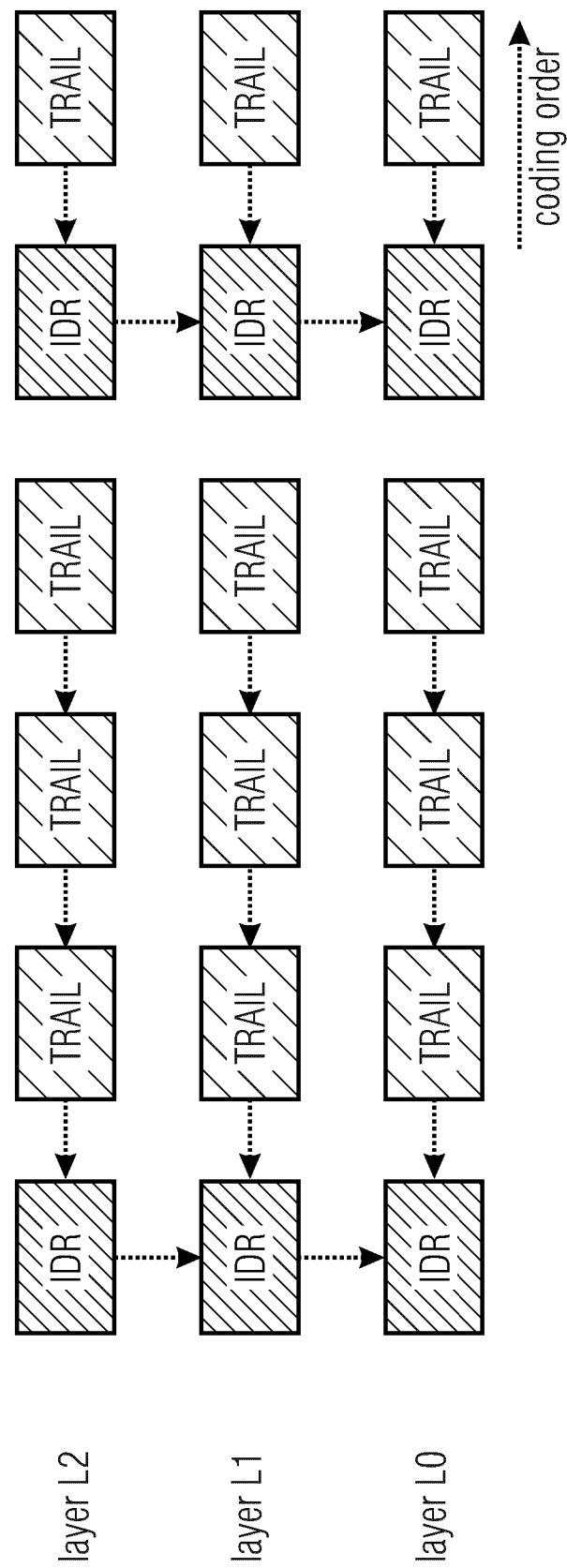
Figure 5:
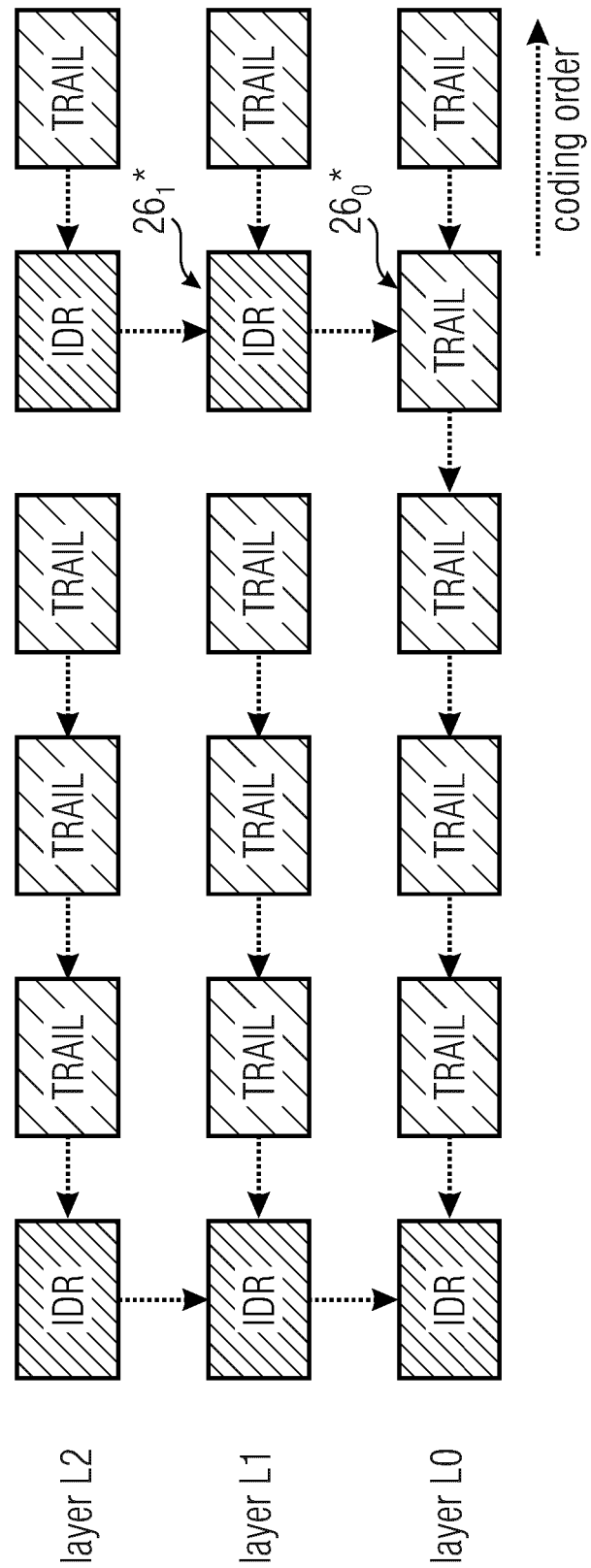
Figure 6:
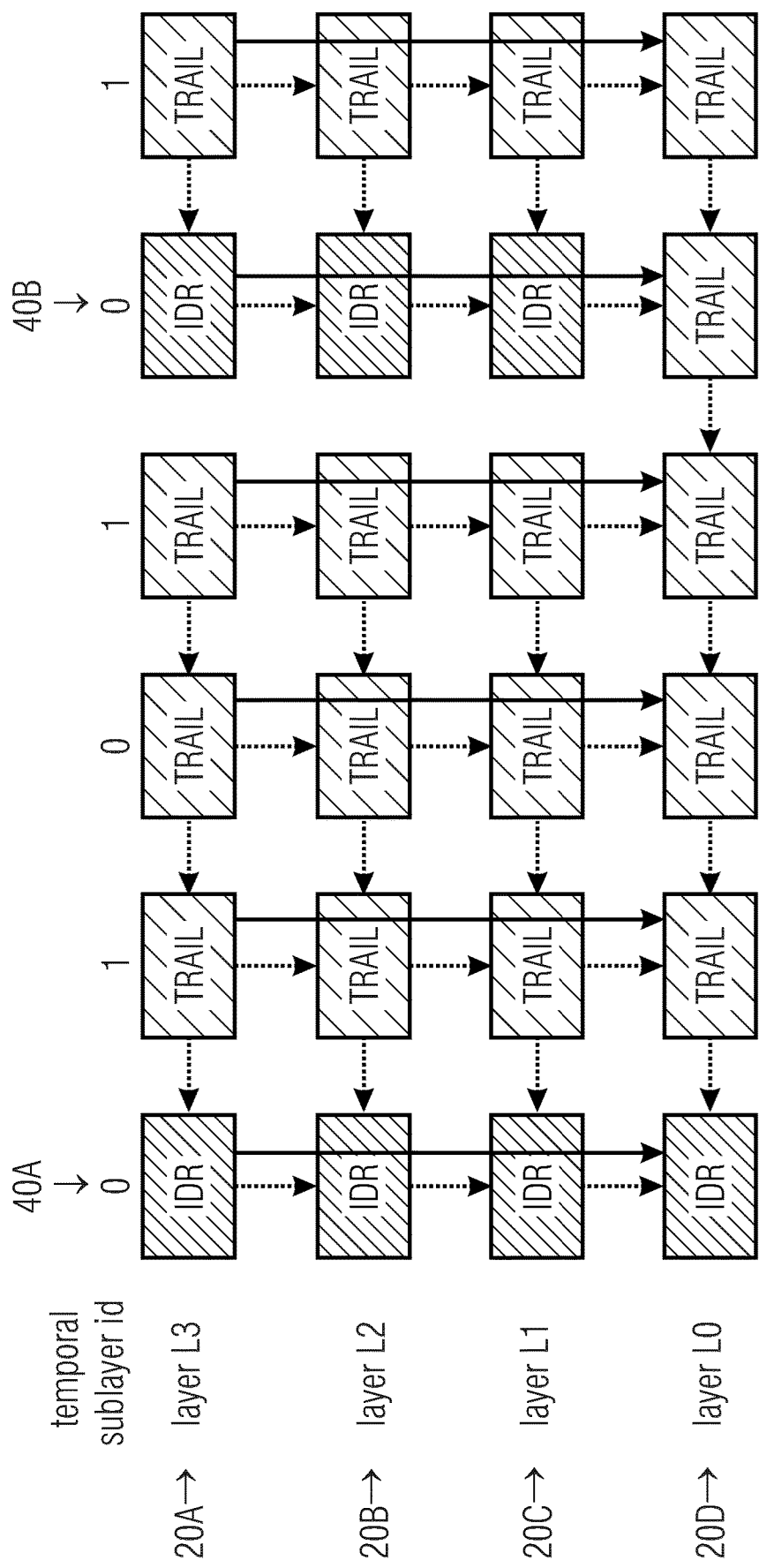
Figure 7:
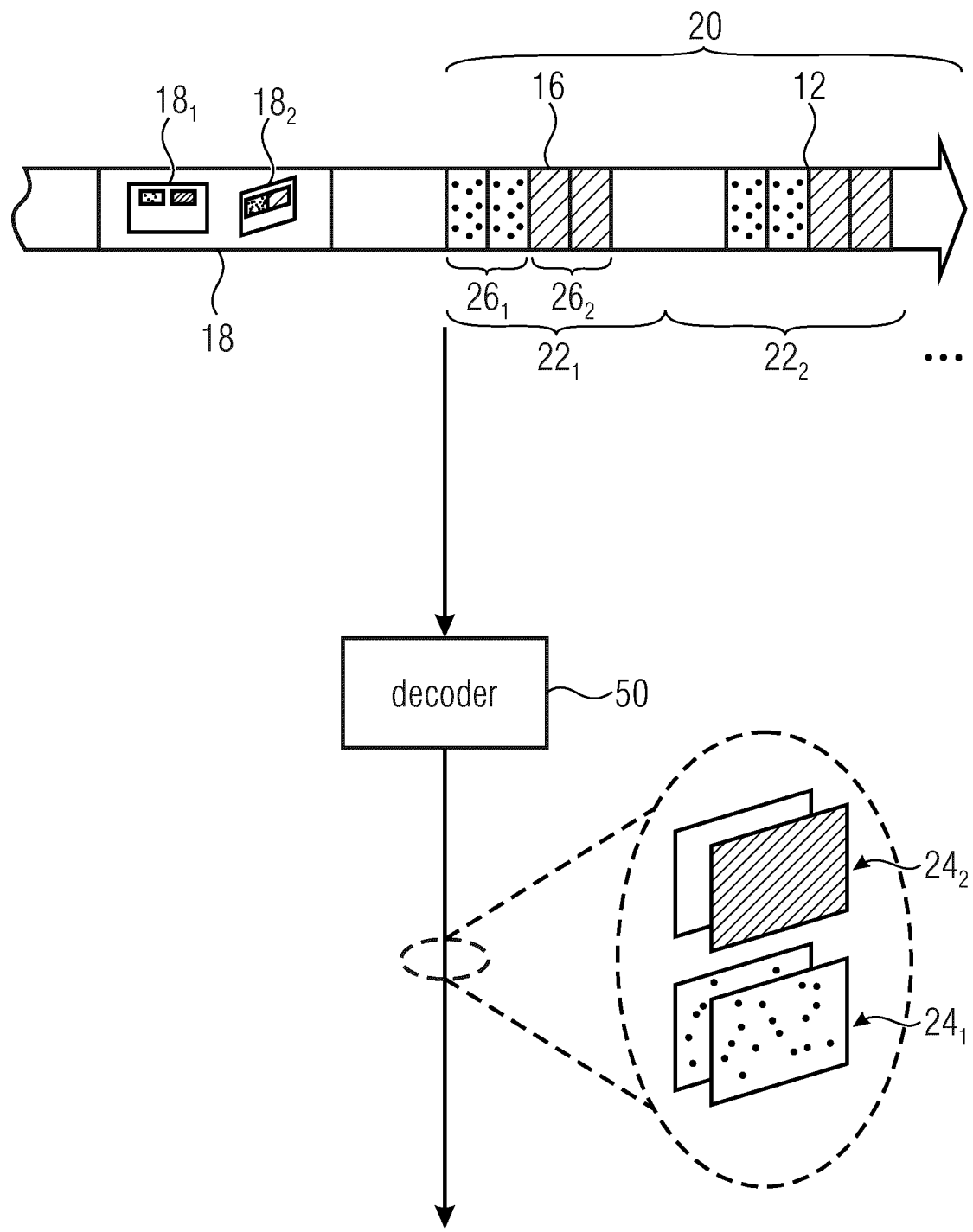
Figure 8:
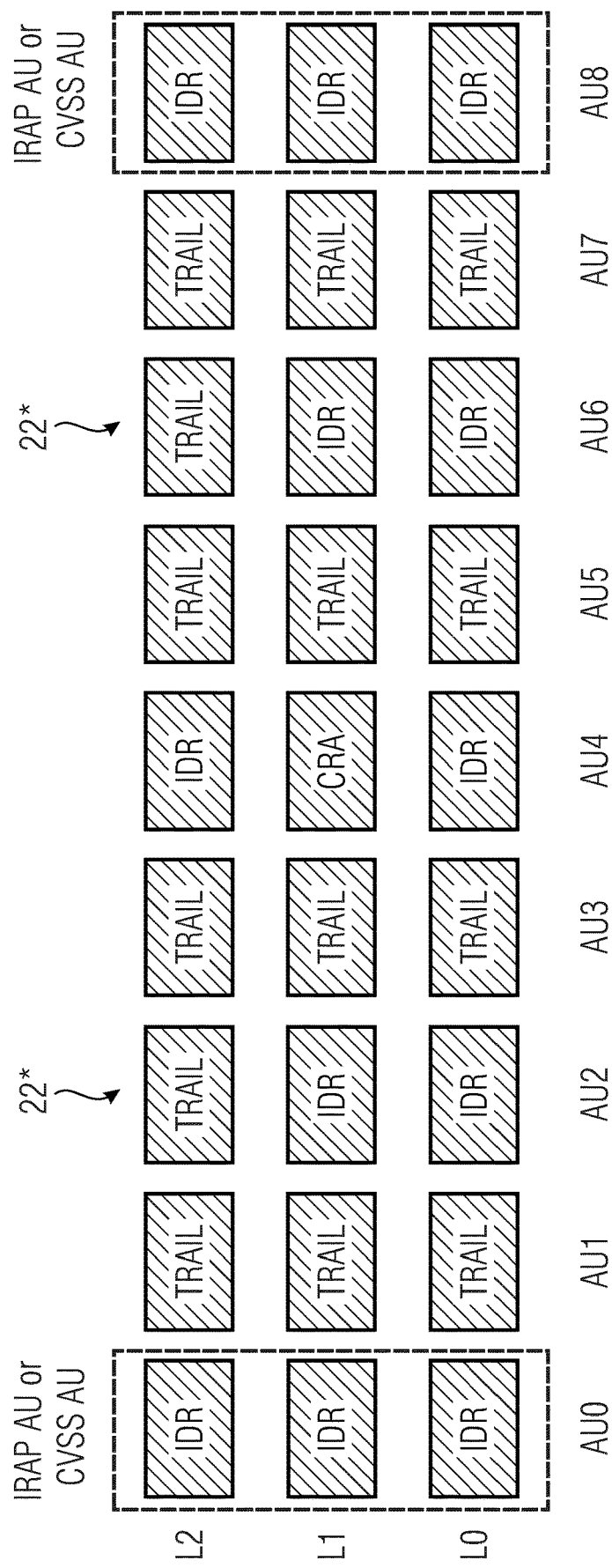
Figure 9:
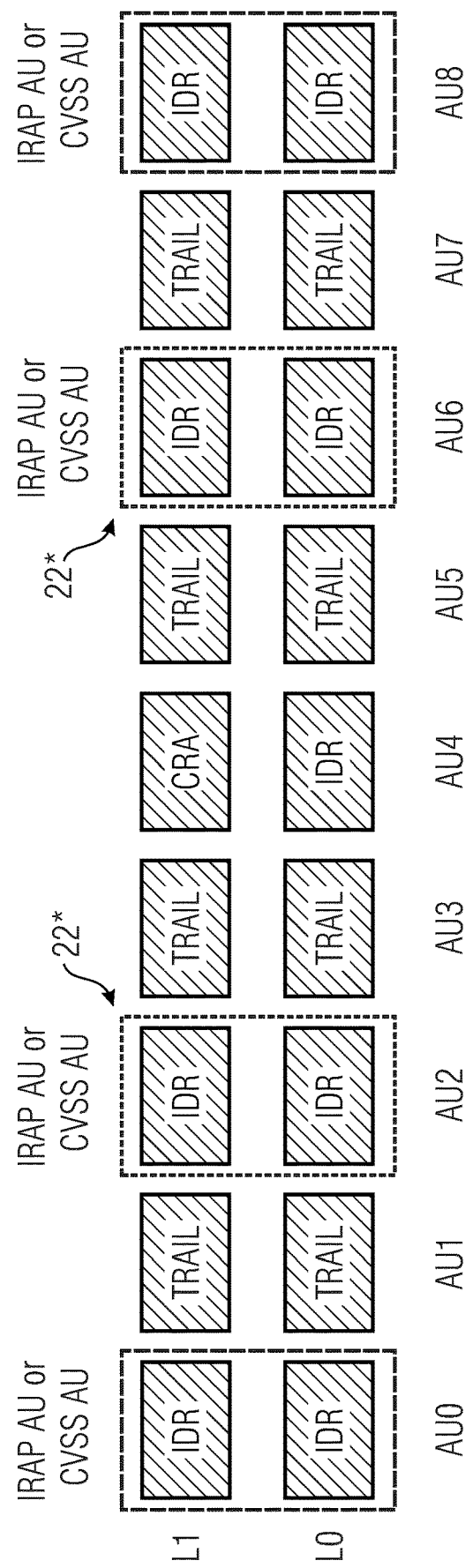
Figure 10:
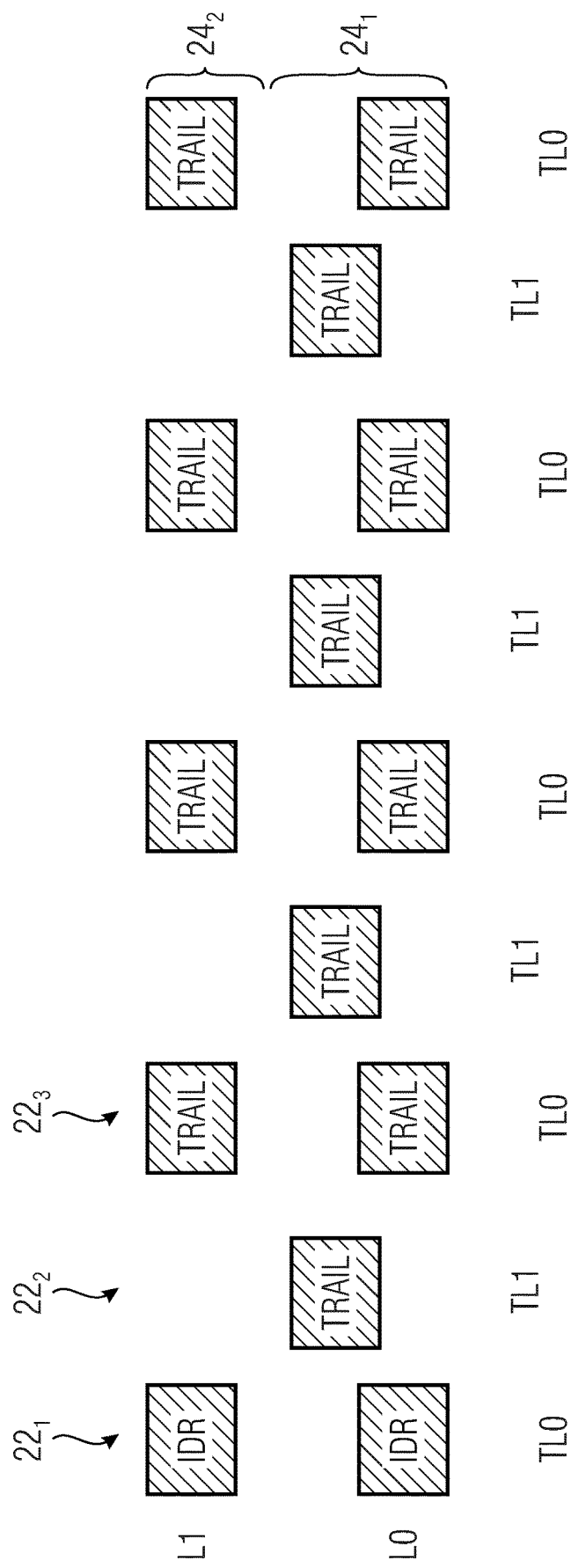
Figure 11:
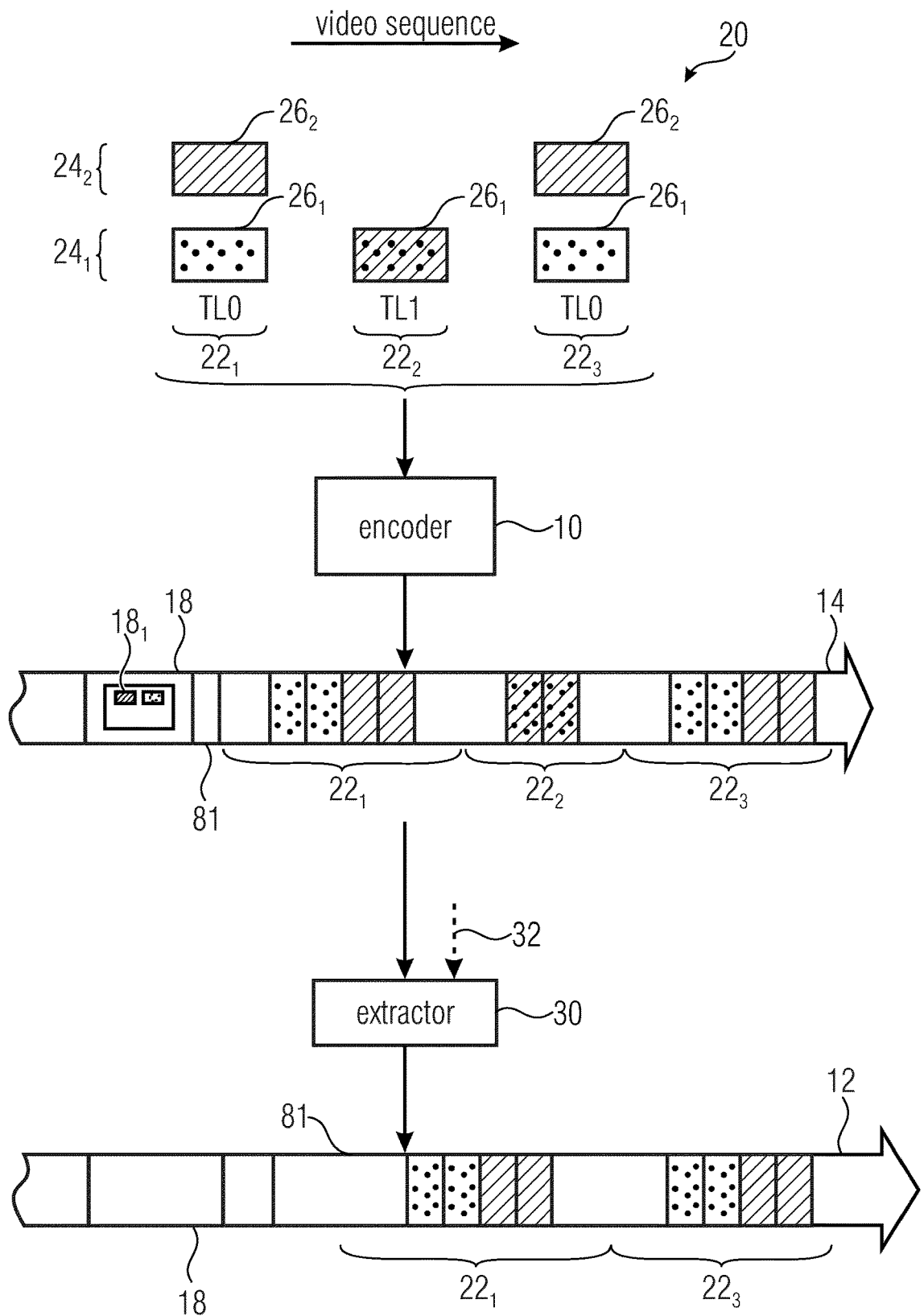
Figure 12:
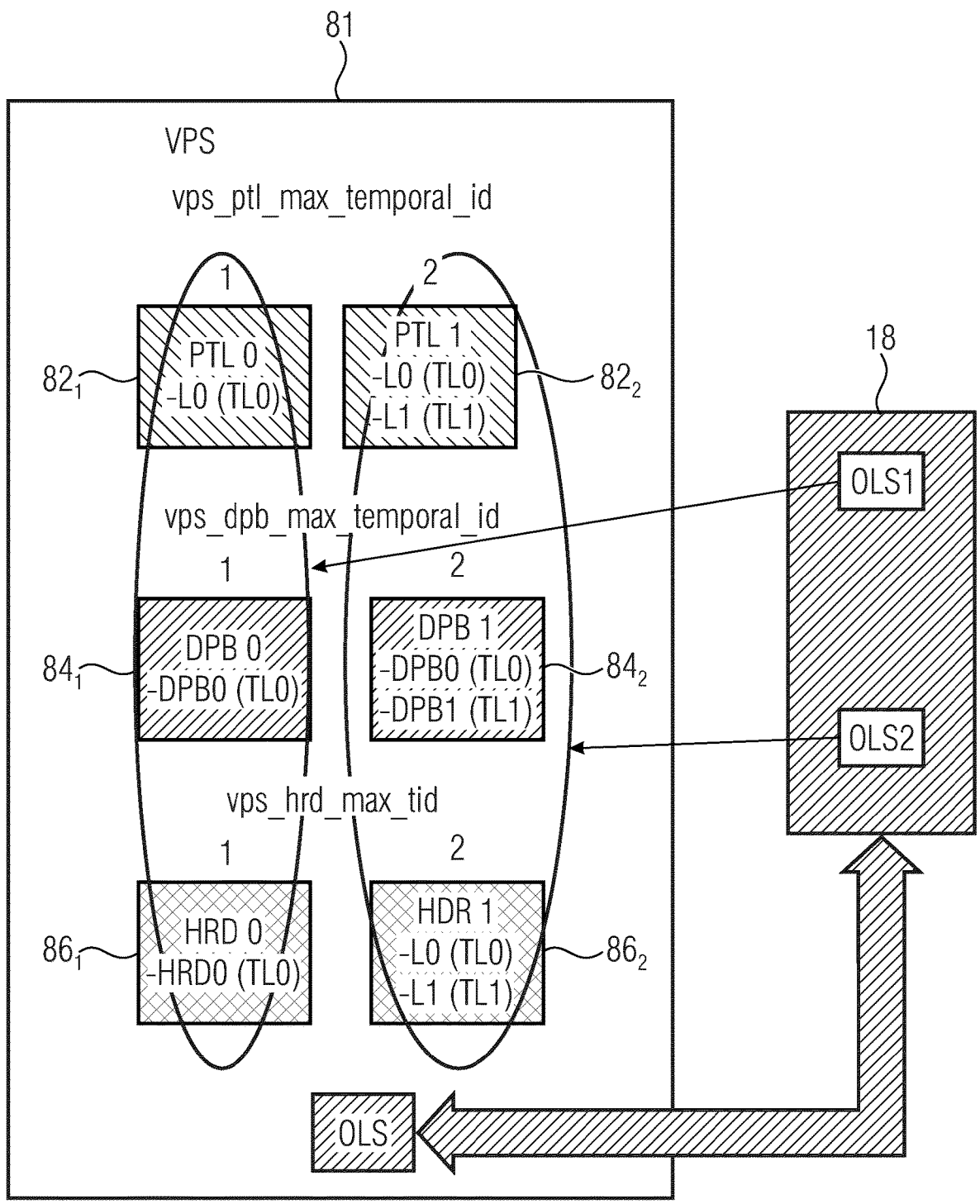
Figure 13:
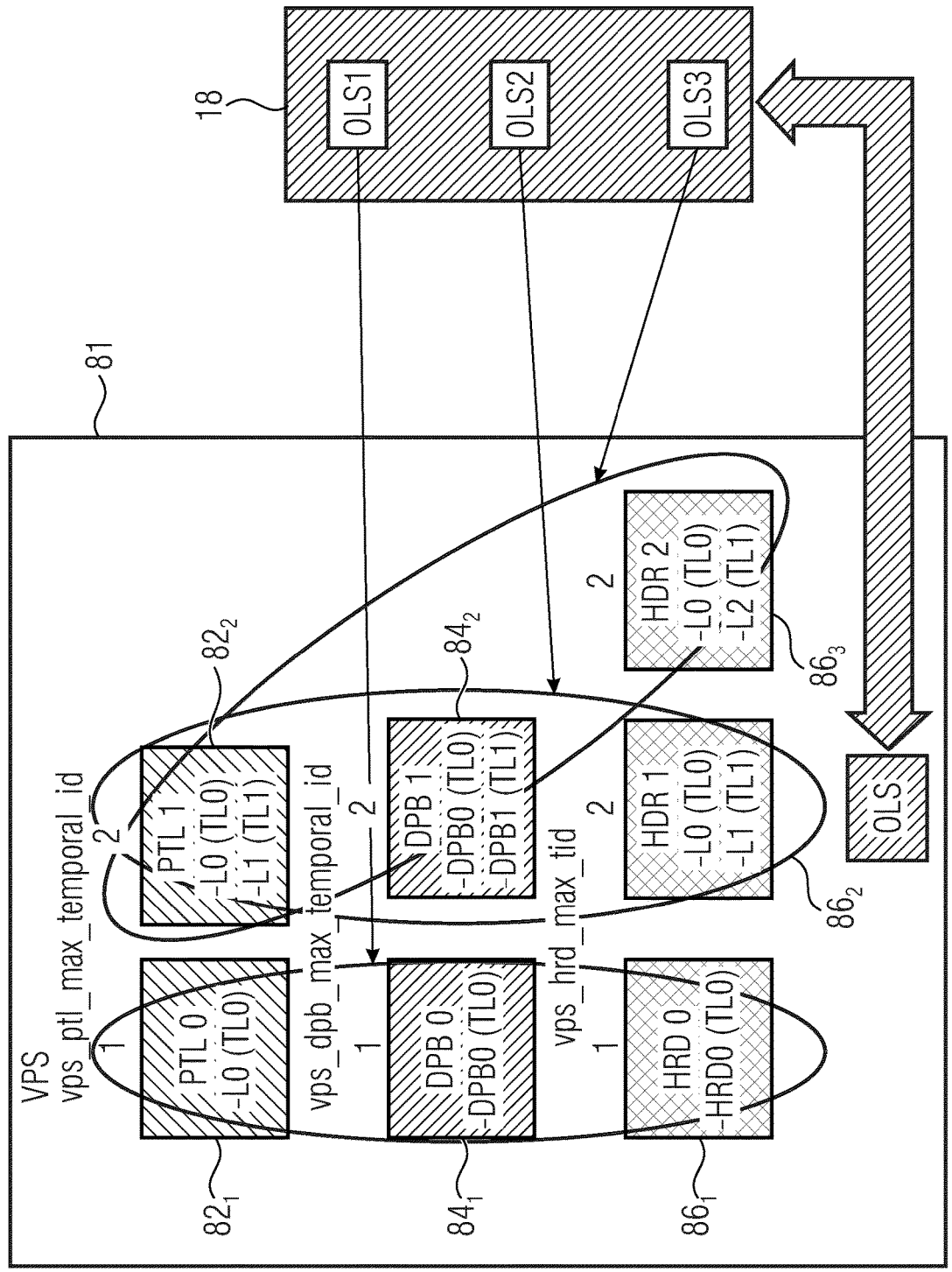
Figure 14:
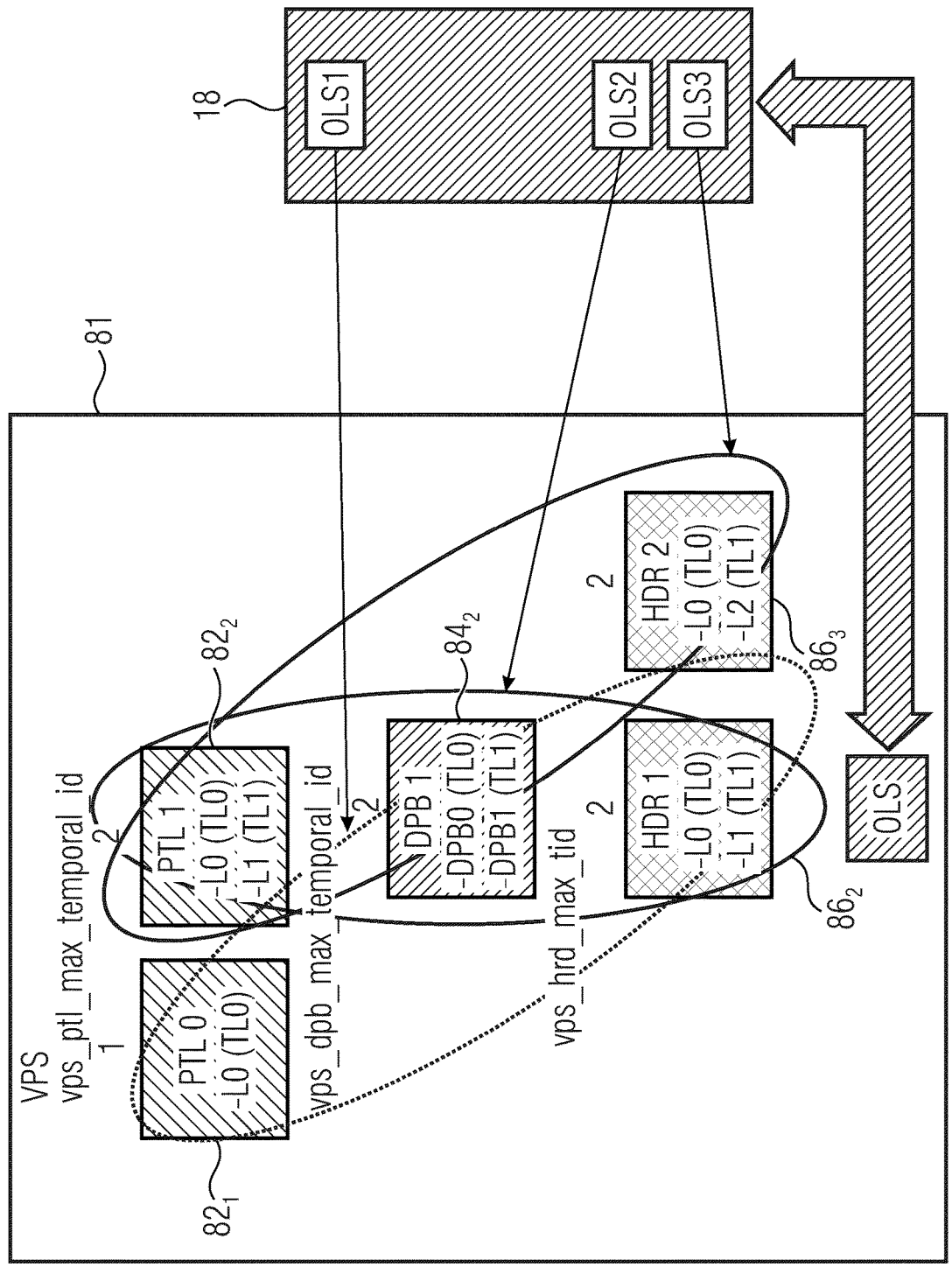
Figure 15:
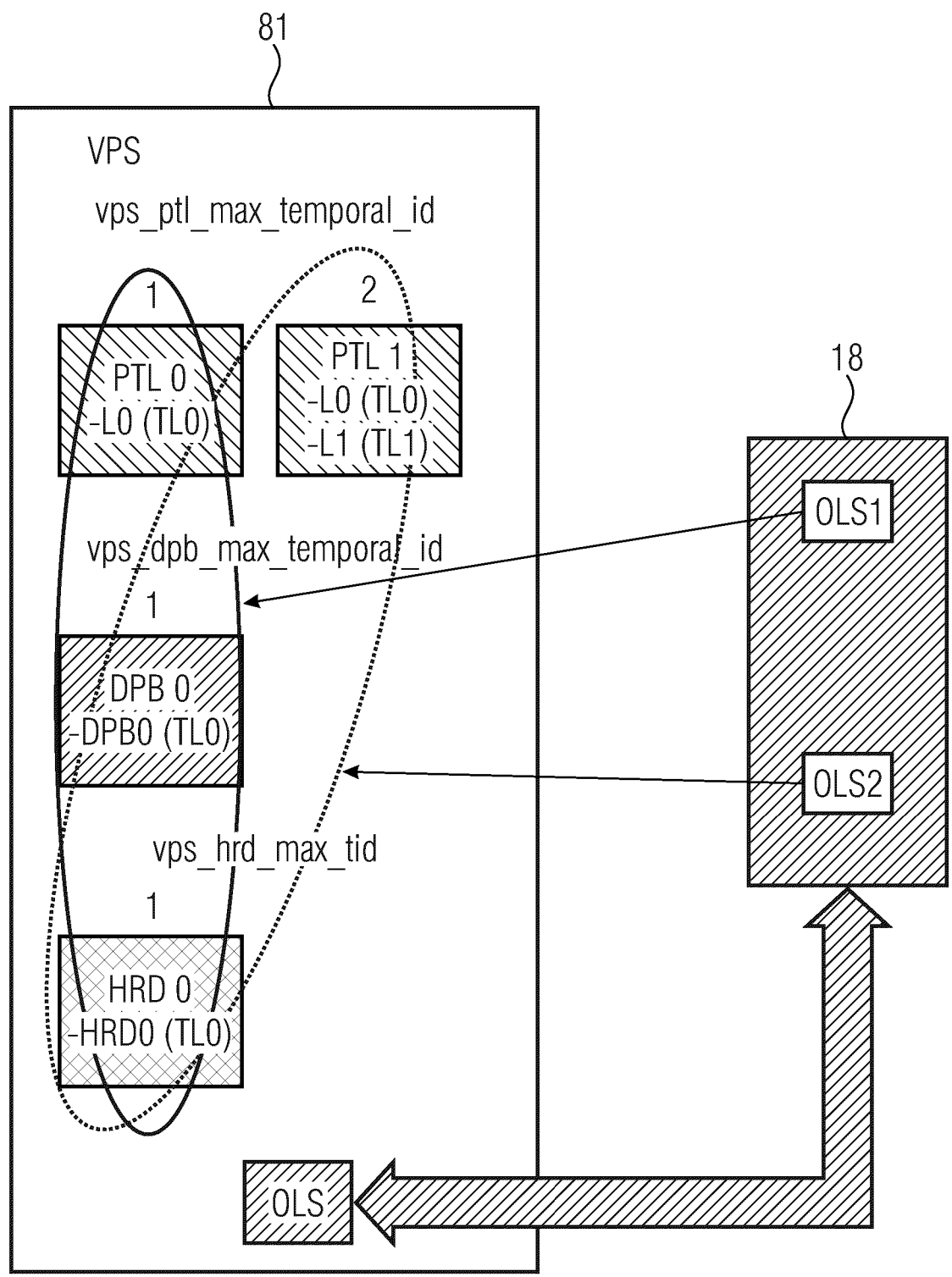

Further embodiments and advantageous implementations of the present disclosure are described in more detail below with respect to the figures, among which:

FIG. 1 illustrates examples of an encoder, an extractor, a decoder and a multi-layered video bitstream according to embodiments, FIG. 2 illustrates an example of an output layer set for a random accessible sub-bitstream, FIG. 3 illustrates an example of an extracted random accessible sub-bitstream having an unused picture, FIG. 4 illustrates an example of a three-layer bitstream having aligned independently coded pictures over three layers, FIG. 5 illustrates an example of a three-layer bitstream having unaligned independently coded pictures, FIG. 6 illustrates an example of a four-layer bitstream in which a picture of an access unit comprising independently coded pictures comprises a pictures with reference to another temporal sublayer, FIG. 7 illustrates an example of a decoder according to embodiments, FIG. 8 illustrates an example of a multi-layered video data stream having access units with random-accessible and non-random-accessible pictures, FIG. 9 illustrates an example of a sub-bitstream of the multi-layered video data stream of FIG. 8, FIG. 10 illustrates an example of a multi-layered video bitstream having two layers each of which having a different picture rate, FIG. 11 illustrates an encoder, an extractor, a multi-layered video bitstream and a sub-bitstream according to embodiments, FIG. 12 illustrates an example of a video parameter set and a mapping to output layer sets, FIG. 13 illustrates an example for sharing of video parameters between different output layer sets, FIG. 14 illustrates an example for sharing of the video parameters among different OLSs according to an embodiment, FIG. 15 illustrates a sharing of video parameters between different OLSs according to another embodiment.

In the following, embodiments are discussed in detail, however, it should be appreciated that the embodiments provide many applicable concepts that can be embodied in a wide variety of video coding concepts The specific embodiments discussed are merely illustrative of specific ways to implement and use the present concept, and do not limit the scope of the embodiments. In the following description, a plurality of details is set forth to provide a more thorough explanation of embodiments of the disclosure. However, it will be apparent to one skilled in the art that other embodiments may be practiced without these specific details. In other instances, well-known structures and devices are shown in form of a block diagram rather than in detail in order to avoid obscuring examples described herein. In addition, features of the different embodiments described herein may be combined with each other, unless specifically noted otherwise.

In the following description of embodiments, the same or similar elements or elements that have the same functionality are provided with the same reference sign or are identified with the same name, and a repeated description of elements provided with the same reference number or being identified with the same name is typically omitted. Hence, descriptions provided for elements having the same or similar reference numbers or being identified with the same names are mutually exchangeable or may be applied to one another in the different embodiments.

0. Encoder 10, Extractor 30, Decoder 50 and Video Bitstreams 12, 14 According to FIG. 1

Embodiments described in this section provide an example for a framework into which embodiments of the present invention may be built in. Thereinafter, the description of embodiments of the concept of the present invention is presented along with a description as to how such concepts could be built into the encoder and the extractor of FIG. 1. Although, the embodiments described with respect to the subsequent FIG. 2 and following may also be used to form an encoder and an extractor not operating according to the framework described with respect to FIG. 1. It is further noted that the encoder, the extractor and the decoder may be implemented separately from each other, although they are jointly described in FIG. 1 for illustrative purpose. It is further noted, that the extractor and the decoder may be combined within one apparatus, or that one of the two may be implemented to be part of the other one.

FIG. 1 illustrates examples of an encoder 10, an extractor 30, a decoder 50, a video bitstream 14 (which may also be referred to as video data stream or data stream) and a sub-bitstream 12. Encoder 10 is for encoding a video sequence 20 into the video bitstream 14. Encoder 10 encodes the video sequence 20 into the video bitstream 14 in units of pictures 26, each of the pictures 26 belonging to a time instant, e.g. a frame of the video sequence. Coded video data belonging to a common time instant may be referred to as an access unit (AU) 22. In FIG. 1, an exemplary exert of three access units $22_1$, $22_2$, $22_3$ of the video sequence 20 is illustrated. It is noted that the description referring to access units 22 may refer to any of the exemplary access units $22_1$, $22_2$, $22_3$. Each of the access units 22 comprises, or has encoded thereto, one or more pictures 26, each of which is associated with one of multiple layers of the video bitstream 14. In FIG. 1, examples of the pictures 26 are represented by pictures $26_1$ and pictures $26_2$. Pictures $26_1$ are associated with a first layer $24_1$ of the video bitstream 14, and pictures $26_2$ are associated with a second layer $24_2$ of the video bitstream 14. It is noted that although, in FIG. 1, each of the access units 22 includes a picture for both of the first layer $24_1$ and the second layer $24_2$, video bitstream 14 may include access units 22, which do not necessarily include a picture 26 for each of layers 24 of the video bitstream 14. Further, video bitstream 14 may include further layers in addition to the first and the second layer illustrated in FIG. 1. Encoder 10 is configured for encoding each of the pictures 26 into one or more bitstream portions, e.g. NAL units, of the video sequence 14. For example, each of the bitstream portions 16 into which a picture 26 is coded may have encoded thereinto a portion of the picture 26, such as a slice of the picture 26. Bitstream portions 16, into which the pictures 26 are actually encoded, may be referred to as video-coded layer (VCL) NAL units. Bitstream 14 may further comprise descriptive data, e.g. non-VCL NAL units, indicating information which is descriptive of the encoded video data. For example, each of the access units 22 may include, in addition to the bitstream portions signaling decoded video data, bitstream portions, which signal descriptive data for the respective access unit. Video bitstream 14 may further comprise descriptive data, which refers to a plurality of access units, or a portion of one or more access units. For example, video bitstream 14 may have encoded thereinto an output layer set (OLS) indication 18 indicating one or more output layer sets.

An OLS may be an indication for a sub-bitstream extractable from the video bitstream 14. An OLS may indicate one or more or all of the multiple layers of the video bitstream 14 as output layers of the sub-bitstream described by the respective OLS. It is noted that the set of layers indicated by the OLS may be a not necessarily proper subset of the layers of the video bitstream 14. In other words, all layers of the video bitstream 14 may be included in the OLS. The OLS may optionally further include a description of the sub-bitstream described by the OLS and/or decoder requirements for decoding the sub-bitstream indicated by the OLS. It is noted that the sub-bitstream described by the OLS may be defined by further parameters beside the layer, such as temporal sublayers or subpictures. For example, pictures 26 of a layer 24 may be associated with one of one or more temporal sublayers of the layer 24. A temporal sublayer may include pictures of time instants, which are associated with a respective temporal sublayer. For example, pictures of a first temporal sublayer may be associated with time instants forming a sequence of a first frame rate, and pictures of a second temporal sublayer may be associated with time instants which fall in between the time instants to which the pictures of the first temporal sublayer are associated so that a combination of the first and the second temporal sublayers may provide for a video sequence having a higher frame rate than a single one of the first and second temporal sublayers. The OLS may optionally indicate a temporal sublayer for describing which bitstream portions or pictures 26 belong to the sub-bitstream described by the OLS. The temporal sublayers of a bitstream or coded video sequence may be hierarchically ordered, e.g. by means of indexing. For example, the hierarchical order may imply that decoding of pictures of a bitstream including a certain temporal sublayer requires all temporal sublayer which are lower in hierarchical order.

It is noted that an OLS may include one or more output layers and optionally also one or more non-output layers. In other words, an OLS may indicate one or more of the layers included in the OLS as output layers of the OLS and optionally one or more of the layers of the OLS as non-output layers. For example, a layer including reference pictures for pictures of an output layer of the OLS may be included in the OLS as a non-output layer, as the pictures of the non-output layer may be required for decoding pictures of an output layer of the OLS.

An OLS may further include a level information regarding the bitstream described by the OLS, the level information being indicative of, or associated with, one or more bitstream constraints such as maximum values for one or more of bitrate, picture size, frame rate.

Optionally, the bitstream 14 may further include an extractability indication 19 of an OLS. In example, the extractability indication may be part of the OLS indication. The extractability indication may indicate a (not necessarily proper) subset of the bitstream portions 16 which form a decodable sub-bitstream associated with the OLS. That is, the extractability indication may indicate, which of the bitstream portions 16 belong to the OLS.

Pictures 26 may be encoded into the video bitstream 14 making reference to other pictures, e.g. for prediction of residuals, motion vectors and/or syntax elements. For example, a picture may reference another picture (referred to as reference picture of the picture) of the same access unit, the reference picture being associated with another layer, which may be referred to as interlayer reference picture. Additionally or alternatively, a picture may reference a reference picture which part of the same layer but another access unit than the picture.

Extractor 30 may receive the video bitstream 14 and may select, for example, on the basis of an indication 32 provided to the extractor 30, an OLS out of one or more OLSs indicated in the video bitstream 14. Extractor 30 may provide the sub-bitstream 12 indicated by the selected OLS by forwarding, in the sub-bitstream 12, at least the bitstream portions 16 which belong to the selected OLS. It is noted that extractor 30 may modify or adapt one or more of the bitstream portions 16, so that the forwarded bitstream portions do not necessarily correspond exactly to the bitstream portions 16 signaled in video bitstream 14. In FIG. 1 the apostrophe is used for bitstream portions of the sub-bitstream 12, e.g. reference sign 16', in order to indicate potential changes of the bitstream portions of the video bitstream 14 when forwarded into sub-bitstream 12.

Sub-bitstream 12 may be decoded by decoder 50 so as to obtain a decoded video sequence which is represented by the sub-bitstream 12. It is noted that besides the fact that the decoded video sequence may differ from the video sequence 20 in terms that the decoded video sequence may optionally represent only a portion of the video sequence 20 in terms of resolution, fidelity, frame rate, picture size and video content (in terms of subpicture extraction), the decoded video sequence may have a distortion due to quantization loss.

The pictures 26 of the video sequence 20 may include independently coded pictures which do not reference pictures of other access units. That is, for example, the independently coded pictures are encoded into the video bitstream 14 without using inter-prediction (in terms of temporal prediction, although an independently coded picture may optionally be encoded using interlayer prediction). Due to the independent coding, a decoder may start with decoding the video sequence at an access unit of the independently coded pictures. Independently coded pictures may be referred to as instantaneous random access points (IRAP). An example of IRAP pictures are IDR and CRA pictures. In contrast, a trailing (TRAIL) picture may refer to a picture which references a picture of another access unit which may precede the trailing picture encoding order (order, in which the pictures 26 are coded into the videostream 14). Bitstream portions 16, into which an independently coded picture is encoded may be referred to as independently coded bitstream portions, e.g. IRAP NAL units, whereas bitstream portion 16 into which dependently coded pictures 26 are coded, may be referred to as dependent bitstream portions, e.g. non-IRAP NAL units. It is further noted that not necessarily all bitstream portions of one picture are encoded the same manner out of independent coding and dependent coding. For example, a first portion of a picture 26 of a first access unit, e.g. access unit $22_1$ may be coded independently, while a second portion of the picture 26 of the first access unit may be coded dependently. In this case, in a picture 26 of a second access unit, such as access unit $22_2$, the first portion of the picture 26 of the second access unit may be coded dependently, and the second portion may be coded independently. This way, the higher data rate of independent coding with respect to dependent coding may be distributed over multiple access units. Such coding may be referred to as general decoder refresh (GDR) as the decoder 50 may have to decode several access units before having decoded an entire picture, which is independent from access units preceding the GDR cycle, i.e. a sequence of pictures onto which independently coded portions covering the entire picture are distributed.

In the following, several concepts and embodiments will be described with respect to FIG. 1. It is pointed out that features described with respect to an encoder, a video bitstream, an extractor, or a decoder shall be understood to be also a description of the others of these entities. For example, a feature which is described to be present in a video data stream shall be understood as a description of an encoder being configured to encode this feature into a video bitstream and a decoder or an extractor being configured to read the feature from the video bitstream. It is further pointed out that inference of information based on indications coded into the video bitstream may equally be performed on encoder and decoder side. It is further noted that the aspects described in the following sections may be combined with each other.

1. Random Accessible Sub-Bitstream Indication

This section describes embodiments according to the first aspect making reference to FIG. 1, wherein details described in section 0 may optionally apply to embodiments according to the first aspect. Also details described with respect to the further aspects may optionally be implemented in embodiments described in this section.

A random accessible bitstream portion may refer to an independently coded bitstream portion as described with respect to FIG. 1. Accordingly, a random accessible picture (or bitstream portion) may refer to as an independently coded picture (or bitstream portion, respectively) as described with respect to FIG. 1.

Some embodiments according to the first aspect may refer to an all-IRAP level indication for non-aligned IRAPs. Embodiments may refer to IRAP alignment implications with max_tid_il_ref_pics_plus1==0 (e.g., IDR only refs, or only refs to one of, or any of, IDR, CRA, or GRD with ph_recovery_poc_cnt equal to 0).

FIG. 2 illustrates an example of an output layer set of a video sequence, such as video sequence 20. In other words, the video sequence of FIG. 2 may represent a video sequence formed by the layers of an OLS, including an output layer L1 and a non-output layer L0. In the access unit 22*, the multi-layered OLS bitstream of FIG. 2 comprises an example of non-aligned IRAPs, i.e. the access unit 22* comprises a non-random accessible bitstream portion in one of the layers of the OLS, namely L1 in FIG. 2.

A bitstream that includes an indication of level information for an all-IRAP sub-bitstream, i.e. the result of dropping all non-IRAP NAL units from the bitstream, can be useful for trick-mode playback such as fast-forwarding based on IRAP pictures only. This level information refers to a level_idc indication pointing to a list of defined limits for parameters such as maximum picture size, maximum picture rate, maximum bitrate, maximum buffer size, maximum slices/tiles/subpictures per pictures and minimum compression ratio. However, in the multi-layer case, it is not uncommon that IRAP pictures are not aligned across layer, e.g. a higher (dependent) layer has a higher IRAP distance such that IRAPs are not as frequent in the higher layer as they are in a lower (reference) layer. This is illustrated in FIG. 2, wherein the higher layer L1 of the depicted OLS with two layers does contain a trailing NAL unit at the position with POC (picture order count) 3, i.e. in access unit 22*, whereas the lower layer L0 contains an IRAP NAL units at the same position.

FIG. 3 illustrates an example of an extracted all-IRAP sub-bitstream, extracted from the multi-layered video bitstream of FIG. 2 as it may be performed conventionally. In light of the fact that not all layers of an OLS are to be output by a decoder, e.g. only the higher layer L1 in the example of FIG. 2 is marked as output layer, it would be a wasteful usage of decoder resources to keep the lower (non-output) layer IDR in the bitstream as long as there is not IDR at the corresponding position of the higher (output) layer, as it is the case for picture $26_0$*. The reason being that the decoder output is the same, regardless of L0 IDR at POC 3 being in the all-IRAP sub-bitstream or not, the decoder would not output any picture when decoding the all-IRAP sub-bitstream at POC 3. Further, when the all-IRAP level indication is used to approximate maximum playback speed of the all-IRAP presentation (e.g. in relation to level and playback speed of the full OLS bitstream), decoding said L0 IRAP at POC 3 would lower the achievable maximum playback speed of the all-IRAP sub-bitstream.

It is therefore part of embodiments of the invention, to omit from decoding/drop from such a bitstream and thereby also exclude from consideration by the respective level indication all IRAP NAL units of non-output layers in access units that do not have IRAP NAL units in all the corresponding output layers in the OLS of such an all-IRAP sub-bitstream.

According to embodiments of the first aspect, the video bitstream 14, for example as described with respect to FIG. 1, represents the coded video sequence 20, the video bitstream 14 comprising a sequence of access units 22, each of which comprises one or more bitstream portions 16, among which each is associated with one of multiple layers 24 of the video bitstream 14. Each of the bitstream portions 16 is one of bitstream portion types including a random-accessible bitstream portion type, e.g. an independently coded bitstream portion type, such as an IRAP type. The video bitstream 14 comprises, e.g. encoded by encoder 10 and to be detected by extractor 30, an OLS indication 18 of an OLS of the video bitstream 14 and an extractability indication 19 for a random accessible sub-bitstream described by the OLS, which OLS includes one or more output layers and one or more non-output layers. For example, the random accessible sub-bitstream may be an all-IRAP sub-bitstream. For example, the OLS indication may include a level indication for the all-IRAP sub-bitstream. It is noted that the term all-IRAP sub-bitstream is not to be understood that the all-IRAP sub-bitstream does necessarily exclusively include random accessible or IRAP bitstream portions. Rather, the random accessible sub-bitstream, or the all-IRAP sub-bitstream may in some cases include non-IRAP or non-random accessible bitstream portions, e.g. bitstream portions of reference pictures of random-accessible bitstream portions. In other examples, the random accessible sub-bitstream may exclusively include random accessible bitstream portions.

According to an embodiment, the encoder 10 provides a video bitstream 14 so that for each of the layers of the OLS, for each of the access units 22 beyond the bitstream portions of the respective access units 22, the bitstream portions of all of the output layers are random accessible bitstream portions if the respective access unit 22 comprises one of the random accessible bitstream portions.

In other words, in one embodiment, it is a requirement of bitstream conformance that the bitstream of which the all-IRAP level indication is indicative does not contain access units without output pictures in all output layers.

There may be use cases in which not all output layers have pictures in every access unit in the original bitstream, e.g. stereo video with different frame rates per eye. In such a case, the bitstream requirement should be less strict.

In another embodiment, it is a requirement of bitstream conformance that the bitstream of which the all-IRAP level indication is indicative does not contain access units without output pictures in one output layer.

Accordingly, according to an embodiment, the encoder 10 according to the first aspect may provide the video bitstream 14 so that for each of the layers indicated by the OLS for the random accessible sub-bitstream, for each of the access units 22, beyond the bitstream portions of the respective access unit 22, the bitstream portions 16 of at least one of the output layers are random-accessible bitstream portions if the respective access unit comprises one of the random-accessible bitstream portions.

The consequence of both (random-accessible bitstream portions in at least one or in all output layers) is such that access units not satisfying the bitstream constraint are either not created on encoder-side or dropped during extraction. In other words, a bitstream containing an indication of a level for only IRAPs is constraint such that there is no AU with an IRAP in a non-output layer and with a non-IRAP NAL unit in a temporally co-located picture in an output layer.

Alternatively, the random-accessible sub-bitstream, of which the OLS indication 18 and the extractability indication 19 are descriptive (the OLS indication and the extractability indication being encoded into the video bitstream 14 by encoder 10), for each of the access units, for each of the bitstream portions of the respective access unit, selectively comprises the respective bitstream portion if one of the following two conditions are fulfilled. The first condition is fulfilled if the respective bitstream portion is a random-accessible bitstream portion and the respective bitstream portion is associated with one of the one or more output layers, for example bitstream portions of picture 26* in FIG. 2. The second condition is fulfilled if the respective bitstream portion is associated with a reference layer of one of the output layers, and the respective bitstream portion is associated with one of the one or more non-output layers, and additionally, either beyond the bitstream portions of the respective access unit, the bitstream portions of at least one of the output layers are random-accessible bitstream portions (true for bitstream portions of picture 26 of FIG. 2, the corresponding access unit comprising bitstream portions of picture 26* which are part of an output layer of the OLS), or alternatively, beyond the bitstream portions of the respective access unit, the bitstream portions of all of the output layers are random-accessible bitstream portions (also true in the case of picture 26** of FIG. 2**).

Accordingly, an apparatus for extracting the sub-bitstream 12 from the video bitstream 14, such as apparatus 30 of FIG. 1, according to the preceding embodiments of the first aspect is configured to provide the sub-bitstream 12 as indicated by the OLS indication of the random accessible sub-bitstream.

In other words, as an alternative to the option of a bitstream constraint that the bitstream of which the all-IRAP level indication is indicative does not contain access units without output pictures in all output layers, according to embodiments, the indicated level does not include such AUs that have this "mixed" of IRAP and non-IRAP NAL units and therefore such AUs need to be dropped when a bitstream with only IRAPs of the indicated level is desired.

A similar case is to be considered when the output layer has an IRAP NAL unit but the reference layers do not. In a further embodiment as long as the output layers have an IRAP NAL unit the NAL units in the co-temporal reference layers are not dropped and considered for the indicated level. For this to work, there is a bitstream constraint that temporal references in the co-located reference layer not having an IRAP NAL unit reference only pictures that are also co-temporal to IRAP NAL units in output layers. Alternatively, the level indicated only applies to AU with all NAL units being IRAP NAL units and all others are to be discarded when such a bitstream for such a level (for only IRAP) is considered.

In a further embodiment instead of referring to the layers selected for an OLS, the requirement that only AUs that have all NAL unit types of IRAP type are considered for an IRAP level indication applies to the whole bitstream. In such a case, since such AUs contain an access unit delimiter with aud_irap_or_gdr_au_flag to 1, the presence of the access unit delimiter with aud_irap_or_gdr_au_flag to 1 when there is IRAP NAL unit (i.e. not consider GDR case) is used for determination whether an AU is considered for the IRAP only level indication.

According to examples of the first aspect, the video bitstream 14 comprises a level indication for the random accessible sub-bitstream, e.g. the random accessible sub-bitstream as described to be extractable according to the extractability information 19. The level indication (also referred to as level information) may indicate, e.g. by means of pointing to a list of levels, a level which is associated with bitstream constraints, as described in section 0. For example, the level indication is associated with one or more of a CPD size, a DPB size, a picture size, a picture rate, a minimum compression ratio, a picture partitioning limit (e.g. tiles/slices/subpictures), (e.g. an HRD timing such as access unit/DU removal times, DPB output times).

In other words, in addition to the level indication, further parameters are relevant when an extracted bitstream with only IRAP access units is considered. These parameters are namely, DPB parameters and HRD parameters.

According to embodiments of the first aspect, a decoder, such as decoder 50, is configured for checking if a picture buffer complies with the random accessible sub-bitstream according to the extractability information 19. For example, decoder 50 may check a level indication in the extractability information, HRD parameters, DPB parameters further of the above-mentioned parameters. The picture buffer may refer to a coded picture buffer and/or a decoded picture buffer of the decoder. Optionally, the decoder 50 may be configured for deriving, from the video bitstream 12, a timing information, e.g. for the picture buffer, for the random accessible sub-bitstream as indicated by the OLS indication 18. Decoder 50 may decode the random accessible sub-bitstream based on the timing information.

In other words, in fact, such an all IRAP variant that omits IRAP in non-output layers that are not accompanied by IRAPs in output layers within the same access unit would also allow to reduce the DPB requirements (i.e. DPB size in terms of picture slots), as it would omit the above described decoding un-used-for-reference no-output pictures. Notably, this is a separate part of the level limits of a bitstream and is not directly related to limits defined by the level_idc of the bitstream. The level in conjunction with the picture size of the bitstream set a limit on the maximum number of pictures that can kept in the DPB. However, DPB parameters include more information such as what is the maximum reordering of pictures when outputting them, i.e. how many pictures may precede another picture in output order but follow it in output order. Such information might be different when the extracted bitstream contains only IRAP pictures. Therefore, it is part of the invention to signal additional DPB parameters for this representation for a decoder to better utilize his resources. One embodiment of this invention is given in the following Table 1.

TABLE 1

| | Descriptor |
|---|---|
| video_parameter_set_rbsp( ) { | |
|   vps_video_parameter_set_id | u(4) |
|   [...] | |
|   for( i = 0; i < TotalNumOlss; i++ ) | |
|     if( vps_num_ptls_minus1 > 0 && | |
|     vps_num_ptls_minus1 + 1 != TotalNumOlss ) | |
|       vps_ols_ptl_idx[ i ] | u(8) |
|   if( !vps_each_layer_is_an_ols_flag ) { | |
|     vps_num_dpb_params_minus1 | ue(v) |
|     if( vps_max_sublayers_minus1 > 0 ) | |
|       vps_sublayer_dpb_params_present_flag | u(1) |
|     for( i = 0; i < VpsNumDpbParams; i++ ) { | |
|       if( | |
|       !vps_all_layers_same_num_sublayers_flag ) | |
|         vps_dpb_max_temporal_id[ i ] | u(3) |
|       dpb_parameters( vps_dpb_max_temporal_id[ i ], | |
|         vps_sublayer_dpb_params_present_flag ) | |
|     } | |
|     for( i = 0; i < NumMultiLayerOlss; i++ ) { | |
|       vps_ols_dpb_pic_width[ i ] | ue(v) |
|       vps_ols_dpb_pic_height[ i ] | ue(v) |
|       vps_ols_dpb_chroma_format[ i ] | u(2) |
|       vps_ols_dpb_bitdepth_minus8[ i ] | ue(v) |
|       if( VpsNumDpbParams > 1 && | |
|       vps_num_dpb_params != NumMultiLayerOlss | |
| ) { | |
|       vps_ols_dpb_params_idx[ i ] | ue(v) |
|       if (level_indication_for_all_irap_present ) | |
|         vps_ols_dpb_params_all_irap_idx[ i ] | ue(v) |
|     } | |
|   } | |
|   vps_general_hrd_params_present_flag | u(1) |
| } | |

In Table 1, level_indication_for_all_irap_present indicates the presence of level information for an all IRAP representation that excludes non-output IRAP pictures that are not accompanied with output layer IRAPs in their respective access units.

For example, vps_ols_dpb_params_all_irap_idx[i] specifies the index, to the list of dpb_parameters( ) syntax structures in the VPS, of the dpb_parameters( ) syntax structure that applies to the i-th multi-layer OLS when an only IRAP subbitstream is considered. When present, the value of vps_ols_dpb_params_idx[i] shall be in the range of 0 to VpsNumDpbParams−1, inclusive. When vps_ols_dpb_params_all_irap_idx[i] is not present, it is inferred to be equal to vps_ols_dpb_params_idx[i]. For a single-layer OLS, the applicable dpb_parameters( ) syntax structure is present in the SPS referred to by the layer in the OLS. Each dpb_parameters( ) syntax structure in the VPS shall be referred to by at least one value of vps_ols_dpb_params_idx [i] or vps_ols_dpb_params_all_irap_idx[i] for i in the range of 0 to NumMultiLayerOlss−1, inclusive.

As pointed out, a further additional information that might be required for the extracted bitstream containing only IRAP NAL units are HRD parameters. HRD parameters may include, for example, one or more or all of the required CPB size, the time at which the access units are removed from the CPB, the bitrate with which the CPB is fed or whether the resulting bitstream after the extraction corresponds to a constant bitrate representation.

2. Reference Picture Alignment

Section 2 describes embodiments according to the second aspect, making reference to FIG. 1, wherein details described in section 0 may optionally apply to embodiments according to the second aspect. Also details described with respect to the further aspects may optionally be implemented in embodiments described in this section.

In VVC, output layer sets define the prediction dependencies between layers of the bitstream. The syntax element vps_max_tid_il_ref_pics_plus1[i][j] that is signalled for all direct reference layers of a given layer allows to further restrict the amount of pictures of the reference layer that are used for prediction as follows:

vps_max_tid_il_ref_pics_plus1[i][j] equal to 0 specifies that the pictures of the j-th layer that are neither IRAP pictures nor GDR pictures with ph_recovery_poc_cnt equal to 0 are not used as ILRPs for decoding of pictures of the i-th layer. vps_max_tid_il_ref_pics_plus1[i][j] greater than 0 specifies that, for decoding pictures of the i-th layer, no picture from the j-th layer with TemporalId greater than vps_max_tid_il_ref_pics_plus1[i][j]−1 is used as ILRP. When not present, the value of vps_max_tid_il_ref_pics_plus1[i][j] is inferred to be equal to vps_max_sublayers_minus1+1.

Note that when not present the value is inferred to vps_max_sublayer_minus1+1, with vps_max_sublayer_minus1 being the maximum number of sublayers present in any layer in the bitstream. For a specific layer, however, the value of the maximum number of sublayers could be smaller.

This syntax element indicates that inter-layer referencing is not used for some sublayers or that some sublayers of reference layers are not required for decoding, as well as a special mode (vps_max_tid_il_refpics_plus1[i][j] equal to 0) where only IRAP NAL units or GDR NAL units with ph_recovery_poc_cnt equal to 0 are required from reference layers for decoding. In addition, the output layer sets that describe a bitstream that is passed to a decoder does not include the NAL units not required as indicated by this syntax element vps_max_tid_il_refpics_plus1[i][j] or such NAL units are dropped a particular decoder implementation that implements the extraction process defined in the specification.

The syntax element vps_max_tid_il_refpics_plus1[i][j] is only present for the direct reference layers. For instance, imagine an OLS with 3 Layers as given in FIG. 4, which illustrates a three layer example with vps_max_tid_il_ref_pics_plus1 equal to 0 for all reference layers: L0, L1, L2 with L2 having L1 as a direct reference layer and L0 as an indirect reference layer since L1 uses L0 as a direct reference layer. In such a case, if vps_max_tid_il_ref_pics_plus1[2][1] is equal to 0, only IRAP NAL units or GDR NAL units with ph_recovery_poc_cnt equal to 0 are to be kept from L1 and consequently from L0 as indicated by the specification. Being more specific, a variable is derived for each layer in an OLS that indicates the number of sublayers kept, i.e. NumSubLayersInLayerinOLS[i][j] where i is the OLS index and j is the layer index. When a layer is an output layer the value of this variable is set to the maximum temporalId that is desired for the bitstream. When it is not an output layer but it is a reference layer for each layer k in the OLS that uses layer j as reference the value of NumSubLayersInLayerinOLS[i][j] is set to the maximum value of min(NumSubLayersInLayerInOLS[i][k],vps_max_tid_il_ref_pics_plus1[k][j]). That is, for each layer k it is checked what is the smallest value between how many sublayer are needed for layer k (NumSubLayersInLayerinOLS[i][k]) and how many sublayers are needed in layer j if all sublayers in layer k where considered (vps_max_tid_il_ref_pics_plus1[k][j]). The smallest value among the two is chosen, since if less sublayers are needed in layer k that what is indicated in vps_max_tid_il_ref_pics_plus1[k][j] only the same amount of sublayers are needed in layer j as in layer k. Then, it is checked for further layers k that use j also as reference and if other layers indicate that more sublayers are needed then the higher value is taken, i.e. the maximum value required once all layers that use layer j as reference are checked.

A problem arises when the IRAP NAL units are not aligned between L0 and L1. For instance, imagine that L1 has an IRAP AU at some point but L0 does not and the IRAP AU in L1 using the non-IRAP AU in L0 as reference as illustrated in FIG. 5, which illustrates a three layer example with unaligned IRAPs in lower layers. In such a case, an IRAP based extraction process would discard the non-IRAP in L0 (picture $26_0$* in FIG. 5) and therefore the IRAP AU in L1 (picture $26_1$* in FIG. 5) could not be decoded.

In an embodiment, when vps_max_tid_il_ref_pics_plus1[i][j] is 0 for a layer i, it is a requirement that any direct or indirect layer of such a layer i, has aligned IRAP or GDR NAL units with ph_recovery_poc_cnt equal to 0. In other words, in any indirect reference layer, the NAL units of that indirect reference layer for which co-temporal NAL units in the direct reference layer which depends on that indirect reference layer are any of IRAP NAL units or GDR NAL units with ph_recovery_poc_cnt equal to 0, need to be any of IRAP NAL units or GDR NAL units with ph_recovery_poc_cnt equal to 0 as well.

According to embodiments of the second aspect, the video bitstream 14 comprises a sequence of access units 22, each of which comprises one or more bitstream portions 16. Each of the bitstream portions 16 is associated with one of multiple layers 24 of the video bitstream 14 and one of multiple temporal layers of the video bitstream, e.g. temporal sublayers as described with respect to FIG. 1. Bitstream portions 16 within the same access unit 22 are associated with the same temporal layer. Further, each of the bitstream portions is one of bitstream portion types including a set of predetermined bitstream portion types. For example, the set of predetermined bitstream portion types may include independently coded bitstream portion types, such as IDR, and optionally a type, which only depends on other access units of the set of predetermined bitstream portion types.

According to an embodiment of the second aspect, encoder 10 is configured to provide, in the video bitstream 14, an OLS indication of an OLS of the video bitstream 14, the OLS including one or more layers of the video bitstream. Further, encoder 10 provides, in the video bitstream, a reference layer indication, indicating, for each layer of the OLS, a set of reference layers, which the respective layer depends on. Further, encoder 10 provides in the video bitstream 14, a temporal layer indication (e.g. vps_max_tid_il_ref_pics_plus1[i][j]), indicating, for each layer (e.g. i) of the OLS, for each reference layer (e.g. j) of the respective layer, whether all bitstream portions of the respective reference layer on which the respective layer depends are of one out of the set of predetermined bitstream portion types, or, if not, the bitstream portions of up to which temporal layer the respective layer depends on (i.e. a subset of the multiple temporal layers (e.g. by indicating a maximum index indexing the temporal layers) to which all bitstream portions, on which the respective layer depends, belong).

Encoder 10 according to this embodiment is configured to provide the video bitstream so that for each layer (e.g. i) of the OLS, for which the temporal layer indication indicates that all bitstream portions of a predetermined reference layer (of the reference layers of the respective layer) on which the respective layer depends are of one (e.g. the same one) out of the set of predetermined bitstream portion types, the access units comprising bitstream portions of the predetermined reference layer which are of one out of the set of predetermined bitstream portion types, are, for each further reference layer on which the predetermined reference layer depends directly or indirectly, free of bitstream portions other than of the set of predetermined bitstream portion types (e.g., a direct dependence or direct reference is a dependence between a (dependent) layer and a reference layer thereof, e.g. as indicated in the reference layer indication, and an indirect dependence or reference is a dependence between a (dependent) layer and a direct or indirect reference layer of a reference layer of the (dependent) layer which is not indicated in the reference layer indication).

Actually, this is a bit more restrictive than necessary. It could be possible that such an indirect reference layer (L0) is also a reference layer of another Layer (imagine now a case with a 4th L3 layer that indicates that sublayer 0 and sublayer 1 of L0 are required by vps_max_tid_il_refpics_plus1[3][0] being equal to 2) as shown in FIG. 6, which illustrates a four layer example with direct references to sublayer with Tid 1.

In such a case the IRAP alignment constraint discussed in the previous embodiment would not be necessary as the non-IRAP NAL units in layer 0 that are required for the IRAP NAL units in L1 would be kept in the OLS bitstream corresponding to L0+L1+L2+L3. Therefore, a variable NumSubLayersInLayerinOLS[i][j] can be used instead to express a constraint, where this variable indicates the number of sublayers (with respective temporal IDs) that are kept in the i-th OLS for the j-th layer (0 meaning only IRAP or GDR with ph_recovery_poc_cnt equal to 0 are kept).

In an embodiment, when within an i-th OLS two layers k and j, with k>j, have NumSubLayersInLayerinOLS[i][j] and NumSubLayersInLayerinOLS[i][k] equal two 0, if j is a reference layer of k (direct or indirect) IRAP NAL units or GDR with ph_recovery_poc_cnt equal to 0 are aligned.

Accordingly, as an alternative to the embodiment described with respect to FIGS. 4 and 5, encoder 10 may provide the bitstream 14 so that for each layer (e.g. i) 20B of the OLS, for which the temporal layer indication indicates that all bitstream portions of a predetermined reference layer 200 (of the reference layers of the respective layer) on which the respective layer 20B depends are of one (e.g. the same one) out of the set of predetermined bitstream portion types, for each further reference layer 20D on which the predetermined reference layer 20C depends directly or indirectly, the following two criterions are fulfilled: as a first criterion, the access units 40A, 40B comprising bitstream portions of the predetermined reference layer which are of one out of the set of predetermined bitstream portion types, are free 40A of bitstream portions other than of the set of predetermined bitstream portion types, or if not 40B. As a second criterion, the respective further reference layer 20D is, according to the reference layer indication, a reference layer of a direct referencing layer 20A which, according to the reference layer indication, depends on the respective layer 20B.

According to an alternative embodiment, the encoder 10 is configured for providing in the video bitstream 14, beside the OLS indication and the reference layer indication described with respect to the previous embodiments, an in-layer temporal layer indication [e.g. NumSubLayersInLayerinOLS[i][j]], indicating, for each layer [e.g. j] of the OLS [e.g. i], whether [e.g. indicating by NumSubLayersInLayerinOLS[i][j]=0] the OLS requires only bitstream portions of the respective layer, which are of one out of the set of predetermined bitstream portion types, or, if not, a subset of temporal layers [e.g. a maximum temporal layer index] comprising bitstream portions of the respective layer which are required by the OLS.

According to this embodiment, the encoder 10 is configured for providing the bitstream 14 so that for each layer 24 of the OLS, for which the in-layer temporal layer indication indicates that the OLS requires only bitstream portions of the respective layer, which are of one out of the set of predetermined bitstream portion types, for each of the access units comprising bitstream portions of one out of the set of predetermined bitstream portion types, for each of the bitstream portions of the respective access unit the following condition is fulfilled: if the respective bitstream portion belongs to a layer of the OLS, for which the in-layer temporal indication indicates that the OLS requires only bitstream portions of the respective layer, which are of one out of a set of predetermined bitstream portion types the respective bitstream portion is of one out of the set of predetermined bitstream portion types, or the respective layer does not, according to the reference layer indication, depend on the layer of the respective bitstream portion.

According to a further embodiment, if IRAPs are not aligned inter layer prediction is not used for such IRAP NAL units for layers where a non-RAP NAL unit is present at the same AU.

Accordingly, according to another embodiment according to the second aspect, the encoder 10 is configured for providing, in the video bitstream 14, the OLS indication, the reference layer indication and the temporal layer indication as described with respect to the previous embodiments of section 2. Further, according to this embodiment, the encoder 10 is configured to, for each layer (e.g. i) of the OLS, for which the temporal layer indication indicates that all bitstream portions of a predetermined reference layer (of the reference layers of the respective layer) on which the respective layer depends are of one out of the set of predetermined bitstream portion types if the access units comprising bitstream portions of the predetermined reference layer which are of one out of the set of predetermined bitstream portion types, are not, for each further reference layer on which the predetermined reference layer depends directly or indirectly, free of bitstream portions other than of the set of predetermined bitstream portion types, for the respective layer, encode the bitstream portions of the access units comprising bitstream portions of the predetermined reference layer which are of one out of the set of predetermined bitstream portion types without using inter prediction methods for bitstream portions that belong to a layer with direct or indirect reference to one of the further reference layers that is not free of bitstream portions other than of the set of predetermined bitstream portion types.

For example, the set of predetermined bitstream portion types may comprise one or more or all of an IRAP-type, and a GDR with ph_recovery_poc_cnt equal to zero-type.

The embodiments of the encoder 10 according to the second aspect may be configured for providing, within the video bitstream 14, a level indication for a bitstream 12 extractable from the video bitstream according to the OLS. For example, the level indication comprises one or more of a coded picture buffer size, a decoded picture buffer size, a picture size, a picture rate, a minimum compression ratio, a picture partitioning limits (e.g. tiles/slices/subpictures), and a bitrate, a buffer scheduling (e.g. a HRD timing (AU/DU removal times, DPB output times).

3. Bitstream Based OLS Determination

Section 3 describes embodiments according to the third aspect of the invention, making reference to FIG. 1, wherein details described in section 0 may optionally apply to embodiments according to the third aspect. Also details described with respect to the further aspects may optionally be implemented in embodiments described in this section.

Embodiments of the third aspect may provide for an identification of an OLS corresponding to the bitstream. In other words, according to embodiments of the third aspect allow for inferring, from a video bitstream, an OLS of the video bitstream which OLS is to be decoded or extracted. A decoder receiving a bitstream to decode may be given additional information via its API regarding what operation point it should target to decode. For instance, in the current WC draft specification, two variables are set via external means as follows.

The variables TargetOlsIdx, which identifies the OLS index of the target OLS to be decoded, and the variable Htid, which identifies the highest temporal sublayer to be decoded, are set by some external means not specified in this Specification. The bitstream BitstreamTo-Decode does not contain any other layers than those included in the target OLS and does not include any NAL unit with TemporalId greater than Htid.

The specification is silent about what to do when these variables are not set, because the expectation is that a decoder in such a case simply decodes the whole bitstream it is given, instead of, for instance, a subset of the bitstream in terms of temporal sublayers.

However, there exists an issue with respect to the output layer sets as follows. When a decoder is given a bitstream that contains more than one layer and the parameter sets define more than one OLS that contains all layers in the bitstream (e.g. variants with different output layers), there is no simple determination from the bitstream itself of which output layer set the decoder is supposed to decode. Depending on the OLS characteristics, the OLSs to select of could pose different level requirements, e.g. due to varying DPS parameter and so on. It is therefore vital to allow a decoder to select an OLS even in absence of outside signals via its API. In other words, a fallback method as in other cases of external means absence is required, e.g. as for the selection of the highest temporal sublayer in a bitstream to decode and so on.

In one embodiment, there exist a constraint of bitstream conformance that the bitstream may only correspond to a single OLS so that a decoder can clearly determine form the bitstream it is given which OLS to be decoded. This property could be instantiated, for instance, by a syntax element indicating that all OLSs are unequivocally determinable by the layers present in the bitstream, i.e. there is a unique mapping from the number of layers to the OLS.

According to embodiments of the third aspect, the encoder 10 for providing the multi-layered video bitstream 14 is configured for indicating, within the multi-layered video bitstream 14, a plurality of OLSs, e.g. in the OLS indication 18 of FIG. 1. Each of the OLSs indicates a subset of layers of the multi-layered video bitstream 14. It is noted that the subset of layers may not necessarily be a proper subset of layers, i.e. a subset of layers may include all layers of the multi-layered video bitstream 14. Encoder 10 according to this embodiment provides the multi-layered video bitstream 14 so that, for each of the OLSs, a sub-bitstream, such as sub-bitstream 12, of the multi-layered video bitstream 14 defined by the respective OLS is distinguishable from a sub-bitstream of the multi-layered video bitstream defined by any other of the OLSs of the plurality of OLSs. For example, encoder 10 may provide the multi-layered video bitstream so that the OLSs indicate mutually different subsets of layers of the multi-layered video bitstream 14, so that the OLSs are distinguishable by their subsets of layers.

For example, each of the OLSs may be defined by indicating in the OLS indication 18, for the OLS, a subset of layers by means of layer indices. Optionally, the OLS indication may comprise further parameters which define a subset of the bitstream portions of the layers of the OLS, which bitstream portions belong to the OLS. For example, the OLS indication may indicate which of temporal sublayers belong to the OLS.

In examples, encoder 10 may indicate within the multi-layered video bitstream 14 that the multi-layered video bitstream 14 is unambiguously attributable to one of the OLSs. For example, encoder 10 may indicate the plurality of OLSs so that, for each of the OLSs the subset of layers of the respective OLS is different from any of the subsets of layers of the other OLSs. Accordingly, in examples, encoder 10 may indicate within the multi-layered video bitstream 14 that the set of layers, which may, for example, be indicated by a set of indices, of the multi-layered video bitstream 14 is unambiguously attributable to one of the OLSs.

According to embodiments, the encoder 10 is configured for checking a conformity of the multi-layered video bitstream 14 by checking if for each of the OLSs of the plurality of OLSs a sub-bitstream of the multi-layered video bitstream 14, defined by the respective OLS, is distinguishable or different from a sub-bitstream of the multi-layered video bitstream defined by any other of the OLSs. For example, if this is not the case, encoder 10 may deny bitstream conformity.

Accordingly, an embodiment of a decoder for decoding a video bitstream, for example decoder 50 of FIG. 1, in decoding of the video bitstream, for example the video bitstream 14 or a video bitstream extracted therefrom, such as the video bitstream 12 of FIG. 1, may derive, from the video bitstream to be decoded, one or more OLSs, each indicating the subset of layers of the video bitstream. The decoder may detect within the video bitstream, the indication indicating that the video bitstream is unambiguously attributable to one of the OLSs, and may decode the one of the OLSs attributable to the video bitstream.

For example, decoder 50 may identify the OLSs attributable to the video bitstream by identifying layers included in the video bitstream and decode the OLSs, which exactly identify the layers included in the video bitstream. Thus, the indication indicating that the video bitstream is unambiguously attributable to one of the OLSs may indicate that the set of layers within the video bitstream is unambiguously attributable to one of the OLSs.

For example, decoder 50 may determine the one of the OLSs which is attributable to the video bitstream by inspecting a first of the access units of the coded video sequence. The first access unit may refer to a first received, a first of a temporal order, a first in decoding order, or a first in output order. Alternatively, decoder 50 may determine the one of the OLSs by inspecting a first of the access units being of a sequence start access unit type, e.g. a CVSS access unit, the first being defined by receiving order, temporal order, decoding order, for instance. For example, decoder 50 may inspect the first of the access units of the coded video sequence or the first of the access units being of a sequence start access unit type regarding layers included in the respective access unit.

For example, decoder 50 may determine the one of the OLSs so that, for the first access unit of the coded video sequence or the first of the access units being of the sequence start access unit type, the respective access unit comprises pictures of exactly the layers of the one OLS.

Some of the above embodiments may have the downside that certain combinations of OLS are forbidden, e.g. in a multi-view two layer scenario having an OLS that outputs both views and one that outputs only a view that is coded dependently. In order to mitigate this restriction, another embodiment of the invention is to have a selection algorithm among the OLSs that correspond to the bitstream or the first access unit thereof or a CVSS AU thereof. e.g. through combinations of one or more of the following Selecting the OLS with the highest or lowest index,
Selecting the OLS with the highest number of output layers.

FIG. 7 illustrates a decoder 50 according to an embodiment, which may optionally be in accordance with the latter embodiment having a selection algorithm. Decoder 50 according to FIG. 7 may optionally correspond to decoder 50 according to FIG. 1. Decoder 50 according to FIG. 7 is configured for decoding a video bitstream 12, for example video bitstream 12 being extracted from the multi-layered video bitstream 14, as illustrated in FIG. 1. Alternatively, video bitstream 12 of FIG. 7 may correspond to video bitstream 14 of FIG. 1. Video bitstream 12 of FIG. 7 may be, but is not necessarily, a multi-layered video bitstream, i.e. it may, in examples, be a single layer video bitstream. Video bitstream 12 comprises access units 22, e.g. access units $22_1$, $22_2$, of a coded video sequence 20, each access unit comprising one or more pictures 26, e.g. pictures $26_1$, $26_2$, of the coded video sequence. Each of the pictures 26 belongs to one of one or more layers 24 of the video bitstream 12, e.g. as described in section 0. Decoder 50 according to FIG. 7 is configured for deriving, from the video bitstream 12, one or more OLSs. For example, video bitstream 12 comprises an OLS indication 18, e.g. as described with respect to FIG. 1, the OLS indication 18 indicating one or more OLSs such as OLS $18_1$ and OLS $18_2$ as illustrated in FIG. 7. Each of the one or more OLSs indicates a (not necessarily proper) set of one or more layers 24 of the video bitstream 12. In other words, each of the OLSs indicates one or more of the layers to be part of the respective OLS. Decoder 50 determines one of the OLSs based on one or more attributes of each of the OLSs and decodes the one OLS determined out of the OLSs. As described with respect to the previous embodiments, decoder 50 may determine the subset of OLSs and the one OLS by inspecting a first of the access units of the coded video sequence or a first of the access units being of a sequence start access unit type. For example, access unit $22_1$ illustrated in FIG. 7 may be the first (e.g. first received or first in the coding order or first in temporal order or first in output order) of access units of a coded video sequence of the video bitstream 12. In other examples, the coded video sequence 20 may include further access units preceding the access unit $22_1$, the preceding access units not being sequence start access units, so that access unit $22_1$ is the first sequence start access unit of the sequence 20. Decoder 50 may inspect access unit $22_1$ so as to detect a picture $26_1$ of the first layer $24_1$ and a picture $26_2$ of the second layer $24_2$. Based on this finding, decoder 50 may conclude that video bitstream 12 comprises the first layer $24_1$ and the second layer $24_2$.

According to the embodiment of FIG. 7, decoder 50 determines the one OLS to be decoded on the basis of one or more attributes of the OLSs. The one or more attributes may include one or more of an index of the respective OLS (i.e. an OLS index) and/or a number of layers of the OLS and/or a number of output layers of the respective OLS. For example, the decoder determines, out of the OLSs, the OLS having the highest or lowest OLS index and/or the highest number of layers and/or the highest number of output layer as the one OLS. In other words, decoder 50 may evaluate which of the OLSs has the highest or lowest OLS index and/or which of the OLSs has the highest number of layers. Additionally or alternatively, decoder 50 may evaluate, which of the OLSs of the comprises the output layer having the highest or lowest index. By selecting the one OLS by highest number of output layers and/or highest number of layer, the bitstream providing the highest quality output for the video sequence may be selected for decoding.

For example, the decoder 50 may select, out of the OLSs, the one having the highest number of output layers, and beyond the OLSs having the highest number of output layers the one having the highest number of layers, and beyond the OLS having the highest number of layers beyond the OLSs having the highest number of output layers the one having the lowest OLS index as the one OLS.

According to an embodiment, decoder 50 determines the one OLS out of the OLSs by evaluating which of the OLSs has the largest number of layers, and in case that there are multiple OLSs having the largest number of layers, decoder 50 may evaluate which of the OLSs having that largest number of layers has the largest number of output layers and may select the OLS having the largest number of output layers beyond the OLSs having the largest number of layers as the one OLS.

In other words, in absence of an instruction of an OLS which is to be encoded, the decoder 50 may decode, out of the OLSs indicated in the OLS indication 18, the one of which all required layers are present in the bitstream and which makes use of most of the present layers, thus providing for a high fidelity video output.

In the following, a further embodiment of the decoder 50 is described with respect to FIG. 7. Also this further embodiments of the decoder 50 may optionally be in accordance with the previously described selection algorithm, and may optionally correspond to decoder 50 according to FIG. 1. According to this further embodiment, decoder 50 is configured for decoding a video bitstream 12, for example video bitstream 12 being extracted from the multi-layered video bitstream 14, as illustrated in FIG. 1. Alternatively, video bitstream 12 of FIG. 7 may correspond to video bitstream 14 of FIG. 1. Video bitstream 12 of FIG. 7 may be, but is not necessarily, a multi-layered video bitstream, i.e. it may, in examples, be a single layer video bitstream. Video bitstream 12 comprises access units 22, e.g. access units $22_1$, $22_2$, of a coded video sequence 20, each access unit comprising one or more pictures 26, e.g. pictures $26_1$, $26_2$, of the coded video sequence. Each of the pictures 26 belongs to one of one or more layers 24 of the video bitstream 12, e.g. as described in section 0. Decoder 50 according to this further embodiment is configured for deriving, from the video bitstream 12, one or more OLSs. For example, video bitstream 12 comprises an OLS indication 18, e.g. as described with respect to FIG. 1, the OLS indication 18 indicating one or more OLSs such as OLS $18_1$ and OLS $18_2$ as illustrated in FIG. 7. Each of the one or more OLSs indicates a (not necessarily proper) set of one or more layers 24 of the video bitstream 12. In other words, each of the OLSs indicates one or more of the layers to be part of the respective OLS. Decoder 50 according to this further embodiment determines, from the OLSs (or out of the OLSs) a subset of OLSs so that each of the OLSs of the subset of OLSs is attributable to the video bitstream 12. Decoder 50 according to this further embodiment further determines one of the subsets of OLSs based on one or more attributes of each of the subset of OLSs and decodes the one OLS determined out of the subset of OLSs.

For example, an OLS being attributable to the video bitstream may signify, that the set of one or more layers present in the video bitstream 12 corresponds to the set of layers indicated in the respective OLS. In other words, decoder 50 may determine the subset of OLSs being attributable to the video bitstream 12 on the basis of the set of layers present in the video bitstream 12. That is, decoder 50 may determine the subset of OLSs so that, for each of the subset of OLSs, the subset of layers indicated by the respective OLS corresponds to a set of layers of the video bitstream 12. For example, in FIG. 7 video bitstream 12 exemplarily comprises a picture $26_1$ of a first layer $24_1$ and a picture $26_2$ of a second layer $24_2$. OLS $18_1$ indicates the first layer $24_1$ and the second layer $24_2$ to be part of the OLS $18_1$. Also, OLS $18_2$ indicates that both of the first and the second layers are part of the OLS $18_2$. Thus, according to the example of FIG. 7, decoder 50 may attribute both of the OLSs $18_1$, $18_2$ to be part of the subscript of OLSs being attributable to the video bitstream 12.

Optionally, the decoder 50 may only consider those OLSs for decoding, which according to a level information for the OLS are decodable by decoder 50.

As described with respect to previous embodiments, decoder 50 may determine the subset of attributable OLSs and the one OLS by inspecting a first of the access units of the coded video sequence or a first of the access units being of a sequence start access unit type. For example, access unit $22_1$ illustrated in FIG. 7 may be the first (e.g. first received or first in the coding order or first in temporal order or first in output order) of access units of a coded video sequence of the video bitstream 12. In other examples, the coded video sequence 20 may include further access units preceding the access unit $22_1$, the preceding access units not being sequence start access units, so that access unit $22_1$ is the first sequence start access unit of the sequence 20. Decoder 50 may inspect access unit $22_1$ so as to detect a picture $26_1$ of the first layer $24_1$ and a picture $26_2$ of the second layer $24_2$. Based on this finding, decoder 50 may conclude that video bitstream 12 comprises the first layer $24_1$ and the second layer $24_2$.

According to embodiments, decoder 50 may determine the subset of OLSs so that, for the first of the access units of the coded video sequence or the first of the access units being of a sequence start access unit type, e.g. access unit $22_1$, the respective access unit comprises pictures of exactly the layers of each of the subset of OLSs.

According to the embodiment of FIG. 7, decoder 50 determines the one OLS to be decoded on the basis of one or more attributes of the subset of OLSs. The one or more attributes may include one or more of an index and/or a number of output layers of the respective OLS, a highest or lowest index, i.e. a highest or lowest layer index, and a highest number of layers. In other words, decoder 50 may evaluate which of the OLSs of the subset of OLSs attributable to the video bitstream 12 comprises the layer being indexed with the highest or lowest layer index and/or which of the OLSs has the highest number of layers. Additionally or alternatively, decoder 50 may evaluate, which of the OLSs of the subset of OLSs has the highest or the lowest number of output layers and/or which of the OLSs of the subset of OLSs comprises the output layer having the highest or lowest index.

According to an embodiment, decoder 50 determines the one OLS out of a subset of OLSs by evaluating which of the OLSs has the largest number of layers, and in case that there are multiple OLSs having the largest number of layers, decoder 50 may evaluate which of the OLSs having that largest number of layers has the largest number of output layers and may select the OLS having the largest number of output layers beyond the OLSs having the largest number of layers as the one OLS.

In other words, in absence of an instruction of an OLS which is to be encoded, the decoder 50 may decode, out of the OLSs indicated in the OLS indication 18, the one of which all required layers are present in the bitstream and which makes use of most of the present layers, thus providing for a high fidelity video output.

In other words, embodiments of the third aspect include a decoder 50 for decoding a video bitstream 12, 14, wherein the video bitstream 14 comprises access units 22 of a coded video sequence 20, and wherein each access unit 22 comprises one or more pictures 26 of the coded video sequence, wherein each of the pictures belongs to one of one or more layers 24 of the video bitstream 14. The decoder is configured to: derive, from the video bitstream 14, one or more output layer sets (OLSs) $18_1$, $18_2$, each indicating a set of one or more layers of the video bitstream 14; determine, from the OLSs $18_1$, $18_2$, a subset of OLSs $18_1$, $18_2$, each of the subset of OLSs being attributable to the video bitstream 14; determine one of the subset of OLSs based on one or more attributes of each of the subset of OLSs; decode the one OLS.

According to an embodiment, the decoder 50 is configured to determine the subset of OLSs so that, for each of the subset of OLSs, the subset of layers indicated by the respective OLS corresponds to a set of layers of the video bitstream 14.

According to an embodiment, the decoder 50 is configured to determine the subset of OLSs and the one OLS by inspecting a first of the access units 22 of the coded video sequence or a first of the access units 22 being of a sequence start access unit type.

According to an embodiment, the decoder 50 is configured to determine the subset of OLSs so that, for a first of the access units 22 of the coded video sequence or a first of the access units 22 being of a sequence start access unit type, the respective access unit comprises pictures of exactly the layers of each of the subset of OLSs.

According to an embodiment, the decoder 50 is configured to determine the one of OLSs by evaluating each one criterion for the one or more attributes of the subset of OLSs.

4. Sequence Start Access Units in Sub-Bitstreams

Section 4 describes embodiments of the fourth aspect of the invention making reference to FIG. 1. The description of which is provided in section 0 may optionally apply to embodiments of the fourth aspect. Also details described with respect to the further aspects may optionally be implemented in embodiments described in this section.

Some embodiments of the fourth aspect may relate to access unit delimiters (AUD) in supplemental enhancement information (SEI) to allow coded video sequence start access units (CVSS AU) that were not CVSS AU originally, i.e. in a video bitstream, such as video bitstream 14, from which the video bitstream, e.g. video bitstream 12, is extracted. For example, a CVSS AU may be a AU which is random accessible, e.g. having random accessible or independently coded picture in each of layers of the video bitstream, or which decodable independently from previous AU of the video bitstream.

The current specification mandates a Coded Video Sequence Start (CVSS) AU to have an IRAP NAL unit type or GDR NAL unit type at each layer and IRAP NAL units types to be the same within the CVSS AU. In addition, it mandates the presence of an AUD (access unit delimiter) indicating that the CVSS AU is an IRAP AU or a GDR AU.

FIG. 8 that shows an example of a multilayer bitstream that does not have aligned IRAPs at different layers, i.e. in which not all IRAPs are aligned across layers, and identification of CVSS AUs.

It can be seen that AU2, AU 4 and AU6 have NAL unit types of IRAP type in the lowest two layers but since not all layers have the same IRAP type in these AUs, those AUs are not CVSS AUs. In order to easily identify CVSS AUs without needing to parse all NAL units of an AU, the AUD nal unit is used so that they are easily identified. That means that AU0 and AU8 would contain an AUD with a flag indicating that these AUs are CVSS AUs (IRAP AUs).

FIG. 9 illustrates an example of a video bitstream after extraction, e.g. video bitstream 12. However, when a bitstream is extracted with L0 and L1 only, new CVSS AUs exist in the extracted bitstream as indicated by reference sigh 22*. In other words, after extraction some AUs (e.g. AUs 22*) turn into CVSS AUs.

Since AU2 and AU6 become CVSS AUs or IRAP AUs an AUD needs to be present in the bitstream at such AUs indicating the IRAP AU property.

Embodiments according to the fourth aspect include an apparatus for extracting a sub-bitstream from a multi-layered video bitstream, for example the extractor 30 for extracting the sub-bitstream 12 from the multi-layered video bitstream 14 as described with respect to FIG. 1. According to the fourth aspect, the multi-layered video bitstream 14 represents a coded video sequence, such as coded video sequence 20, and the multi-layered video bitstream comprises access units 22 of the coded video sequence. Each of the access units 22 comprises one or more bitstream portions 16 of the multi-layered video bitstream 14, wherein each of the bitstream portions belongs to one of the layers 24 of the multi-layered video bitstream. According to the fourth aspect, extractor 30 is configured for deriving, from the multi-layered video bitstream 14, one or more OLSs, each indicating a (not necessarily proper) subset of layers of the multi-layered video bitstream 14. For example, the multi-layered video bitstream comprises the OLS indication 18 comprising information about or a description of one or more OLSs, such as OLS 18₁, OLS 18₂ as illustrated in FIG. 7.

Extractor 30 according to the fourth aspect is configured for providing, within the sub-bitstream 12, the layers 24 of the multi-layered video bitstream 14 which are indicated by a predetermined one of the OLSs, i.e. which are indicated to be part of the predetermined OLSs. In other words, extractor 30 may provide, within the sub-bitstream 12 the bitstream portions 16 which belong to the respective layers of the predetermined OLS. For example, the predetermined OLS may be provided to extractor 30 by external means, e.g. by an OLS instruction 32 as indicated in FIG. 1. According to embodiments of the fourth aspect, extractor 30 provides within the sub-bitstream 12, for each of the access units of the sub-bitstream 12 a sequence start indication indicating the respective access unit to be a starting access unit of a subsequence of the coded video sequence, if all bitstream portions of the respective access unit are bitstream portions of the same out of a set of predetermined bitstream portions types, for example for the access units 22* of the sub-bitstream comprising L0 and L1 described with respect to FIGS. 8 and 9.

In other words, extractor 30 may provide the access units which extractor 30 includes or provides in the sub-bitstream 12, which access units exclusively include bitstream portions of the same out of the set of predetermined bitstream portion types with the sequence start indication.

For example, the set of predetermined bitstream portion types may include one or more IRAP NAL unit types and/or GDR NAL unit types. For example, a set of predetermined bitstream portion types may include a NAL unit type of IDR_NUT, GRA_NUT or GDR_NUT.

For example, the extractor 30 may determine, for each of the access units not having a sequence start indication within the multi-layered video bitstream, or alternatively, for each of the access units of the sub-bitstream 12, if all bitstream portions of the respective access unit are bitstream portions of the same out of the set of predetermined bitstream portion types. For example, the extractor 30 may parse to respective access units or in associated information within the multi-layered video bitstream for determining if all bitstream portions of the respective access unit are bitstream portions of the same out of the set of predetermined bitstream portion types.

In other words, in one embodiment, the bitstream extraction process removes the unnecessary layers and adds an AUD NUT into such a use when they are not present in the AU that requires an AUD after extraction.

According to embodiments, the extractor 30 is configured for inferring, for the predetermined OLS, from an indication within the multi-layered video bitstream 14 that one of the access units is a starting access unit of a subsequence of the coded video sequence represented by the predeterminded OLS, and provide within the sub-bitstream a sequence start indication indicating the one access unit to be a starting access unit.

In other words, in another embodiment, there is an indication in the bitstream at such AUs (i.e. the ones which become CVSS AUs), that such AUs, when a layer is extracted becomes CVSS AUs or IRAP AUs so that the insertion (addition) of the AUD is simpler and does not require so much parsing.

According to a further embodiment, extractor 30 is configured for extracting, for the predetermined OLS, a nested information, e.g. a nested SEI, indicating that one or more access units, e.g. access units which are not start access units of the multi-layered video bitstream 14, are starting access units for the OLS. According to this embodiment, extractor 30 provides within the sub-bitstream a sequence start indication indicating the one or more access units indicated within the nested information to be starting access units. For example, extractor 30 may provide each of the indicated access units with the sequence start indication as described before. Alternatively, the apparatus may provide within the sub-bitstream a common indication for the indicated access units.

In other words, in another embodiment, there is a nesting SEI that can encapsulate AUDs so that when a particular OLS is extracted that would turn a AU into an IRAP/GDR AU, the encapsulated AUD is decapsulated and added to the bitstream. Currently the specification includes only nesting of other SEI messages. Therefore, a non-VCL non-SEI payload needs to be allowed into the nesting SEI. One way is to extend the existing nesting SEI and indicate that a non-SEI is included. Another one is to add a new SEI that contains other non-VOL payloads within a SEI.

A first option for implementation is shown in Table 2:

TABLE 2

|  | Descriptor |
|---|---|
| scalable_nesting( payloadSize ) { |  |
|   nesting_ols_flag | u(1) |
|   nesting_subpic_flag | u(1) |
|   if( nesting_ols_flag ) { |  |
|     nesting_num_olss_minus1 | ue(v) |
|     for( i = 0; i <= nesting_num_olss_minus1; i++ ) |  |
|       nesting_ols_idx_delta_minus1[ i ] | ue(v) |
|   } else { |  |
|     nesting_all_layers_flag | u(1) |
|     if( !nesting_all_layers_flag ) { |  |
|       nesting_num_layers_minus1 | ue(v) |
|       for( i = 1; i <= |  |
|         nesting_num_layers_minus1; i++ ) |  |
|         nesting_layer_id[ i ] | u(6) |
|     } |  |
|   } |  |
|   if( nesting_subpic_flag ) { |  |
|     nesting_num_subpics_minus1 | ue(v) |
|     sei_subpic_id_len_minus1 | ue(v) |
|     for( i = 0; i <= nesting_num_subpics_minus1; i++ ) |  |
|       nesting_subpic_id[ i ] | u(v) |
|   } |  |
|   nesting_num_seis_minus1 | ue(v) |
|   while( !byte_aligned( ) ) |  |
|     nesting_zero_bit /* equal to 0 */ | u(1) |
|   for( i = 0; i <= nesting_num_seis_minus1; i++ ) |  |
|     sei_message( ) |  |
|   nesting_num_nonVclNuts_minus1 | ue(v) |
|   for( i = 0; i <= nesting_num_nonVclNuts_minus1; i++ ) |  |
|     length_minus1 | ue(v) |
|     nonVclNut( ) |  |
| } |  |

A nesting SEI would encapsulate other SEIs (sei_message( )) and a given number (nesting_num_nonVclNuts_minus1) of non-VCL NAL units that are not SEIs. Such encapsulated non-VOL NAL unit would be written in the nested SEI (nonVclNut) directly preceded by their length (length_minus1) so that their boundaries within the nested SEI can be found.

Table 3 shows another option, option 2:

TABLE 3

|  | Descriptor |
|---|---|
| nonVclNutPayload( payloadSize ) { |  |
|   AUD_rbsp( ) |  |
| } |  |

In Option 2, a type could be added that allows also other non-VOL nal units so that if in the future other non-VOL NAL unit need to be included into the nesting SEI the nonVclNutPayload SEI message can be used.

In such a case, there is a new SEI message defined that directly includes a single non-VOL NAL unit, in this case the access unit delimiter (AUD_rbsp( )) and therefore such an encapsulating SEI can be directly added to a nesting SEI without any change to the nesting SEI (the nesting SEI already includes other SEIs inside itself).

According to further embodiments of the fourth aspect, the extractor 30 is configured for providing, for each of the access units of the sub-bitstream, a sequence start indication indicating the respective access unit to be a starting access unit of a subsequence of the coded video sequence if all bitstream portions of the respective access units are bitstream portions of the same out of the set of predetermined bitstream portion types and the respective access unit includes bitstream portions of two or more layers.

In another embodiment, AUDs are mandated also for access units that may become IRAP AUs or GDR AUs in case of OLS extraction (layer dropping) so that an extractor can be sure they are present when required and easily rewrite the aud_irap_or_gdr_au_flag to 1 when appropriate (i.e. AU turns to IRAP or GDR AU after extraction). One way to phrase this constraint in the specification would be to extend currently existing text that makes AUDs mandatory for IRAP or GDR AUs of the current bitstream:

There can be at most one EOB NAL unit in an AU, and when vps_max_layers_minus1 is greater than 0, there shall be one and only one AUD NAL unit in each IRAP or GDR AU.

This would be change to the following:

There can be at most one EOB NAL unit in an AU, and when vps_max_layers_minus1 is greater than 0, there shall be one and only one AUD NAL unit in each AU that contains at least two layers with only IRAP or GDR NAL unit.

In other words, instead of using all NAL units using the words IRAP or GDR pictures:

There can be at most one EOB NAL unit in an AU, and when vps_max_layers_minus1 is greater than 0, there shall be one and only one AUD NAL unit in each AU that contains at least two IRAP or GDR pictures.

Accordingly, further embodiments according to the fourth aspect include an encoder 10 for providing a multi-layered video bitstream, for example encoder 10 as described with respect to FIG. 1. Embodiments of the encoder 10 according to the fourth aspect are configured for providing the multi-layered video bitstream representing a coded video sequence such as the video sequence 20. The multi-layered video bitstream 14 provided by encoder 10 comprises a sequence of access units 22, each of which comprises one or more pictures, among which each is associated with one of multiple layers 24 of the video bitstream. Encoder 10 is configured for providing, for each of the access units of the multi-layered video bitstream 14, within the sub-bitstream 12, a sequence start indicator indicating whether or not all pictures of the respective access unit are pictures of one out of the set of predetermined picture types, if the respective access unit comprises at least two pictures of one out of the set of predetermined picture types. Optionally, encoder 10 is configured for providing, in the multi-layered video bitstream 14, an output layer set (OLS) indication 18 of an OLS, the OLS including one or more layers of the multi-layered video bitstream 14, and the encoder 10 provides the sequence start indicator for the respective access unit, if the respective access unit comprises at least two pictures of one out of the set of predetermined access unit types.

For example, the picture types include one or more IRAP picture types and/or GDR picture types. A picture being of a picture type may signify that each of one or more bitstream portions into which the picture is coded are of one out of a set of predetermined bitstream portion types, such as one or more IRAP NAL unit types or GDR NAL units.

For example, the sequence start indicator mentioned in the embodiments throughout section 4 may be provided in form of, or as part of, an access unit delimiter (AUD), which may be a bitstream portion provided within the respective access unit. For example, the indication that the access unit is a sequence start access unit may be indicated by setting a flag of the AUD, for example an aud_irap_or_gdr_au_flag, for example to a value of 1 for indicating that the respective access unit is a sequence start access unit.

Alternatively, encoder 10 may provide the sequence start indicator not necessarily for each of the access units comprising at least two pictures of one out of the set of predetermined picture types, but encoder 10 may provide the sequence start indicator for each of the access units of the multi-layered video bitstream 14, which access units comprise at least two pictures of one out of the set of predetermined picture types, each of the pictures belonging to one of the layers of an OLS which the encoder indicates in an OLS indication provided in the multi-layered video bitstream 14 by the encoder 10.

As an alternative implementation of the above described embodiment according to which AUDs are mandated also for access units that may become IRAP AUs or GDR AUs in case of OLS extraction (layer dropping) so that an extractor can be sure they are present when required and easily rewrite the aud_irap_or_gdr_au_flag to 1 when appropriate (i.e. AU turns to IRAP or GDR AU after extraction), an encoder would only need to write an AUD NAL unit if such an access unit would correspond to a CVSS AU in at least one OLS that has more than one layer. An example specification reads as follows:

There can be at most one EOB NAL unit in an AU, and when vps_max_layers_minus1 is greater than 0, there shall be one and only one AUD NAL unit in each AU that contains only IRAP or GDR NAL units in all layers of at least one multi-layer OLS.

In other words, using the term IRAP or GDR pictures:

There can be at most one EOB NAL unit in an AU, and when vpsmax_layers_minus1 is greater than 0, there shall be one and only one AUD NAL unit in each AU that contains only IRAP or GDR pictures in all layers of at least one multi-layer OLS.

In this embodiment, the related OLS extraction process would be extended through the following step:

[ . . . ]

The output sub-bitstream OutBitstream is derived as follows:
  The bitstream outBitstream is set to be identical to the bitstream inBitstream.
  Remove from outBitstream all NAL units with TemporalId greater than tIdTarget.
  Remove from outBitstream all NAL units with nal_unit_type not equal to any of VPS_NUT, DCI_NUT, and EOB_NUT and with nuh_layer_id not included in the list LayerIdInOls[targetOlsIdx].
  When an AU contains only NAL units with nal_unit_type equal to a single type of IDR NUT, CRA NUT or GDR_NUT in two or more layers, re-write the flag aud_irap_or_gdr_au_flag to be equal to 1 for the AUD of the AU.

Accordingly, the above described extractor 30 according to the fourth aspect may, provide the sequence start indication by setting a value of a sequence start indicator for the respective access unit 22*. For example, the sequence start indicator may be syntax element signaled in the access unit of the multi-layered video bitstream 14, and extractor 30 may amend or keep the value of the sequence start indicator when forwarding the access unit in the sub-bitstream 12.

In other words, according to embodiments, the above described extractor 30 according to the fourth aspect may, for each of the access units 22 of the sub-bitstream, if all bitstream portions of the respective access unit are bitstream portions of the same out of a set of predetermined bitstream portion types, e.g. access units 22*, provide within the sub-bitstream 12 a sequence start indication indicating the respective access unit to be a starting access unit of a subsequence of the coded video sequence by, in forwarding the respective access unit 22* of the multi-layered video bitstream 14 in the sub-bitstream 12, set a value of a sequence start indicator, e.g. the aud_irap_or_gdr_flag, present in the respective access unit of the multi-layered video bitstream, e.g. present in an AUD NAL unit of the respective access unit 22*, to a predetermined value, e.g. 1, the predetermined value indicating that the respective access unit to be a starting access unit of a subsequence of the coded video sequence. For example, extractor 30 may change the value of the sequence start indicator to be the predetermined value, if it does not have the predetermined value in the multi-layered video bitstream 14.

Accordingly, embodiments of the encoder 10 for providing the multi-layered video bitstream 14 according to the fourth aspect, provides, in the multi-layered video bitstream 14, an OLS indication 18 indicating an OLS including layer of the video bitstream 14, i.e. at least two layers. For each access unit which comprises pictures of one of the predetermined picture types (e.g. the same type, or not necessarily the same type) for the layers of the OLS, the encoder 10 may provide the sequence start indicator in the multi-layered video bitstream 14, the sequence start indicator indicating, whether all picture of the access unit, i.e. also those which are not part of the OLS, are of one of the predetermined picture types, e.g. by means of a value of the sequence start indicator.

In other words, encoder 10 may signal the sequence start indicator for access units, e.g. access units 22*, the pictures of which access units, which pictures belong to one of the layers of the OLS, are of one of the predetermined type.

5. Handling of Temporal Sublayers in the Extraction Process of an Output Layer Set Section 5 describes embodiments in accordance with the fifth aspect of the invention. Embodiments according to the fifth aspect may optionally be in accordance with embodiments of the encoder 10 and the extractor 30 as described with respect to FIG. 1.

Also details described with respect to the further aspects may optionally be implemented in embodiments described in this section.

Some embodiments according to the fifth aspect are related to an extraction process of an OLS and vps_ptl_max_temporal_id[i][j]. Some embodiments according to the fifth aspect may relate to the derivation of NumSublayerinLayer[i][j].

In order to extract an Output Layer Set (OLS), it is necessary to drop or remove the layers that do not belong to the OLS from the bitstream. However, note that layers belonging to an OLS might have different amount of sublayers (temporal layer TLx in FIG. 10).

FIG. 10 illustrates an example of a two-layer bitstream wherein each of the two layers has a different frame rate. The bitstream of FIG. 10 comprises access unit $22_1$ associated with a first temporal layer TL0 and access units $22_2$ associated with a second temporal layer TL1. The first layer $24_1$ includes pictures of both temporal sublayers TL0, TL1, whereas the second layer $24_2$ includes pictures of TL0 only. Thus, the first layer $24_1$ has the double frame rate or picture rate as the second layer $24_2$.

The bitstream of FIG. 10 could have two OLS: one consisting of L0 only, which would have two operating points (e.g., 30 fps TL0 and 60 fps TL0+TL1). The other OLS could consist of L0 and L1 but only of TL0.

The current specification allows to signal the profile and level of the OLS with TL0 and TL1 for L0 but the extraction process misses to generate a bitstream that only has TL0.

Currently, NumSublayerinLayer[i][j] representing the maximum sublayer included in the i-th OLS for layer j is set to vps_max_sublayers_minus1+1 when vps_max_tid_il_ref_pics_plus1[m][k] is not present or layer j is an output layer in the i-th OLS.

FIG. 11 illustrates an encoder 10 and an extractor 30 according to embodiments of the fifth aspect. Encoder 10 and extractor 30 according to FIG. 11 may optionally correspond to the encoder 10 and the extractor 30 as described with respect to FIG. 1. Accordingly, the description of FIG. 1 may optionally also apply to the elements shown in FIG. 11. Encoder 10 according to FIG. 11 is configured for encoding a coded video sequence 20 into a multi-layered video bitstream 14. The multi-layered video bitstream 14 comprises access units 22, eg. access units $22_1$, $22_2$, $22_3$ in FIG. 11 (or also FIG. 1), each of which comprises one or more pictures 26 of the coded video sequence. For example, each of the access units 22 comprises one or more pictures related to one common temporal instant or frame of the coded video sequence as described with respect to FIG. 1. Each of the pictures 26 belongs to one of layers 24 of the multi-layered video bitstream. For example, in the illustrative example of FIG. 11, the multi-layered video bitstream 14 comprises a first layer $24_1$ and a second layer $24_2$, the first layer comprising pictures $26_1$, and the second layer comprising pictures $26_2$. According to the fifth aspect, each of the access units 22 belongs to a temporal sublayer of a set of temporal sublayers TL0, TL1 of the coded video sequence 20. For example, access units $22_1$ and $22_3$ of FIG. 11 may belong to a first temporal sublayer TL0, and access unit $22_2$ may belong to a second temporal sublayer TL1, e.g. as described with respect to FIG. 10. Temporal sublayers may also be referred to as temporal subsets or temporal layers. For example, each of the temporal sublayers is indicated or indexed with a temporal identifier and may be characterized, for example, by a frame rate and/or a temporal relation with respect to the other temporal subsets. For example, each of the access units may comprise or may have associated therewith a temporal identifier which associates respective access units with one of the temporal sublayers.

According to the fifth aspect, encoder 10 is configured for providing the multi-layered video bitstream 14 with a syntax element, e.g. max_tid_within_ols as described above, the syntax element indicating a predetermined temporal sublayer for an OLS, the OLS comprising or indicating a (not necessarily proper) subset of layers of the multi-layered video bitstream 14. The syntax element indicates the predetermined temporal sublayer of the OLS in a manner discriminating between different states including a state according to which the predetermined temporal sublayer is beneath a maximum of temporal sublayers within access units of which a picture of at least one of the subset of layers is. For example, the predetermined temporal sublayer is the maximum temporal sublayer included in the OLS.

For example, the encoder 10 may provide within the multi-layered video data stream 14 the OLS indication 18, for example as described with respect to FIG. 1. The OLS indication 18 may comprise a description or an indication for one or more OLSs, e.g. OLS $18_1$ as shown in FIG. 11. Each of the OLSs may be associated with a set of layers of the multi-layered video data stream 14. In the example illustrated in FIG. 11, OLS $18_1$ is associated with the first layer $24_1$ and the second layer $24_2$. Note that the multi-layered video bitstream 14 may optionally comprise further layers.

For example, with respect to the illustrated example of FIG. 11, OLS $18_1$ may include the first temporal sublayer (to which access units $22_1$ and $22_3$ may belong), but the second temporal sublayer, to which the access units $22_2$ may belong, may, in examples, not be included in the OLS, so that according to this example TL0 may be the maximum temporal sublayer included in the OLS. It is noted that the temporal sublayers may have a hierarchical order. In the example of FIG. 11, the maximum of temporal sublayers within access units 22 of which a picture, e.g. picture $26_1$ if access unit $22_1$, of at least one of the subset of layers (layer $24_1$ which is part of the OLS) is, is TL1. Accordingly, the maximum temporal sublayer included in the OLS is beneath the maximum temporal sublayer TL1. Thus, the predetermined temporal sublayer may, for example, be indicated by indicated that the predetermined temporal sublayer is beneath the maximum temporal sublayer present in access units included at least partially in the OLS. In further example, the predetermined temporal sublayer may be indicated by indicating an index which identifies the predetermined temporal sublayer.

Thus, in the example of the OLS $18_1$, the predetermined temporal sublayer may be the first temporal sublayer. The syntax element provided in the multi-layered video bitstream 14, e.g. max_tid_within_ols or vps_ptl_max_temporal_id, indicates the predetermined temporal sublayer for an OLS. The syntax element discriminates between different states. According to one of the states, the predetermined temporal sublayer is beneath a maximum of temporal sublayers within access units of which a picture of at least one of the subset of layers is. For example, in FIG. 11, the example of the OLS $18_1$ as described above, includes layers $24_1$ and $24_2$. The maximum of temporal sublayers within access units of the subset of layers of OLS $18_1$ is the second temporal sublayer, to which access units $22_2$ belong. In examples, in which the second temporal sublayer does not belong to OLS $18_1$, the syntax element may be indicative of this state.

Extractor 30 according to the fifth aspect may derive the syntax element from the multi-layered video bitstream 14 and may provide the sub-bitstream 12 by selectively forwarding the pictures of the multi-layered video bitstream 14 in the sub-bitstream 12 if the respective picture belongs to one of the layers of the OLS $18_1$, and if the picture belongs to an access unit $22_1$, $22_3$ that belongs to a temporal sublayer equal to, or beneath, the predetermined temporal sublayer.

That is, extractor 30 may provide the bitstream portions of the respective picture 26 in the sub-bitstream 12 if the picture belongs to a temporal sublayer equal to, or beneath, the predetermined temporal sublayer, and may drop, i.e. not forward, the picture otherwise.

In other words, extractor 30 may use the syntax element in the construction of the sub-bitstream 12 for excluding pictures which belong to temporal sublayers which are not part of the OLSs to be decoded, but which are part of one of the layers indicated by the OLS, from being forwarded in the sub-bitstream 12.

According to embodiments, the multi-layered video bitstream 14 indicates, for each of the layers of the OLS, a syntax element which indicates the predetermined temporal sublayer, e.g. the maximum temporal sublayer, included in the respective OLS. The extractor 30 may, based on the syntax elements for the layers of the OLS, discriminate between bitstream portions belonging to a temporal sublayer of the OLS belonging to a temporal sublayer which is not part of the OLS, and consider those bitstream portions for forwarding into the sub-bitstream 12 which belong to a temporal sublayer of the OLS.

For example, the syntax element may be part of the OLS indication 18, for example, the syntax element may be part of the OLS $18_1$ to which it refers. For example, the syntax element may be part of a video parameter set for the respective OLS.

In one embodiment the signaling (e.g. of the maximum temporal sublayer) is provided into the bitstream to indicate that an OLS has a maximum sublayer different to vps_max_sublayers_minus1+1 or to the maximum among all layers present in the OLS. For this purpose, the existing syntax element vps_ptl_max_temporal_id[i][j] may be repurposed to indicate also the maximum sublayer present in an OLS.

According to some embodiments, in addition NumSublayerinLayer[i][j] which represents the maximum sublayer included in the i-th OLS for layer j is changed to vps_ptl_max_temporal_id[i][j] when vps_max_tid_il_ref_pics_plus1[m][k] is not present or layer j is an output layer in the i-th OLS.

Alternatively, a new syntax element could be added that indicates the maximum sublayer within an OLS, e.g. max_tid_within_ols.

According to embodiments, encoder 10 and/or extractor 30 are configured for deriving, for a substream, e.g. the sub-bitstream 12, which is obtained by selectively taking over, for each of the pictures of the multi-layered video bitstream 14, the respective picture, if the picture belongs to one of the layers of the OLS $18_1$, and if the picture belongs to an access unit that belongs to a temporal sublayer equal to, or beneath, the predetermined temporal sublayer, decoder capability-related parameters. In other words, encoder 10 and/or extractor 30 may derive the decoder capability-related parameters for a sub-bitstream which exclusively comprises pictures which belong to temporal sublayers belonging to the OLS describing the sub-bitstream. Encoder 30 or extractor 30 may signal the capability-related parameters in the sub-bitstream 12. Accordingly, encoder 10 may signal the capability-related parameters in the multi-layered video bitstream 14. For example, the decoder capability-related parameters may include parameters as described in section 6.

6. Handling of Temporal Sublayers in Video Parameter Signaling

Section 6 describes embodiments in accordance with the sixth aspect of the invention, making reference to FIG. 11 and FIG. 1. Thus, the description of FIGS. 1 and 11 may optionally apply to the embodiments in accordance with the sixth aspect. Also details described with respect to the further aspects may optionally be implemented in embodiments described in this section.

Some examples in accordance with the sixth aspect relate to a constraint on vps_ptl_max_temporal_id[i], vps_dpb_max_temporal_id[i], vps_hrd_max_tid[i] to be consistent for a given OLS.

The multi-layered video bitstream 14 and/or the sub-bitstream 12 as described with respect to FIG. 1 and/or FIG. 11 may optionally include a video parameter set 81. The video parameter set 81 may include one or more decoder requirement sets, e.g. profile-tier-level-sets (PTL sets), and/or one or more buffer requirement sets, e.g. DPB parameter sets, and/or one or more bitstream conformance sets, e.g. hypothetical reference decoder (HRD) parameter sets. For example, each of OLSs indicated in the OLS indication 18 may be associated with each one of the decoder requirement sets, buffer requirement sets, and bitstream conformance sets applying for the bitstream described by the respective OLS. The video parameter set may indicate, for each of the decoder requirement sets, buffer requirement sets, and bitstream conformance sets a maximum temporal sublayer to which the respective set refers, i.e. a maximum temporal sublayer of a video bitstream or video sequence to which the respective set refers.

FIG. 12 illustrates an example of a video parameter set 81 comprising a first decoder requirement set $82_1$, a first buffer requirement set $84_1$ and a first bitstream conformance set $86_1$ which are associated with a first OLS1 of the OLS indication 18. Further, according to FIG. 12, the video parameter set 81 comprises a second decoder requirement set $82_2$, a second buffer requirement set $84_2$ and a second bitstream conformance set $86_2$ which are associated with a second output layer set OLS2.

For example, each of the OLSs described by the OLS indication 18 may be associated with one of the decoder requirement sets 82, the buffer requirement sets 84 and the bitstream conformance sets 86 by having associated to the respective OLS respective indices pointing to the decoder requirement set, the buffer requirement set and the bitstream conformance set. According to embodiments of the sixth aspect, the multi-layered video bitstream comprises access units, each of which belongs to one of a temporal sublayer of a set of temporal sublayers of a coded video sequence coded into the multi-layered video bitstream 14. The multi-layered video bitstream 14 according to a sixth aspect further comprises the video parameter set 81 and the OLS indication 18. For each of the bitstream conformance sets 86, the buffer requirement sets 84, and the decoder requirement sets 82, a temporal subset indication is indicative of a constraint on a maximum temporal sublayer, e.g. a maximum temporal sublayer to which the respective bitstream conformance set/buffer requirement set/decoder requirement set refers. For example, each of the bitstream conformance sets 86, the buffer requirement sets 84, and the decoder requirement set 82 signal a syntax element indicating the respective temporal subset indication (e.g. vps_ptl_max_temporal_id for the PTL sets, vps_dpb_max_temporal_id for the DPB parameter sets, and vps_hrd_max_tid for the bitstream conformance sets).

As illustrated in FIG. 12, each of the bitstream conformance sets 86, the buffer requirement sets 84, and the decoder requirement set 82 may comprise a set of one or more parameters for each temporal sublayer present in the layer set of layers which comprise bitstream portions of the video bitstream to which the respective bitstream conformance sets 86, buffer requirement sets 84, or decoder requirement set 82 refers. E.g., in FIG. 12, OLS1 includes layer L0 which comprises bitstream portions of the temporal layer TL0, and OLS2 includes layers L0 and L1 which comprise bitstream portions of temporal layers TL0 and TL1. The bitstream conformance set $86_2$ and the decoder requirement set $82_2$ which are associated with OLS2 include parameters for L0, and thus, according to this example, for the temporal layer TL0, and further include parameters for L1, and thus for the temporal layer TL1. The buffer requirement set $84_2$, includes sets of parameters DPB0 for temporal sublayer TL0 and DPB1 for temporal sublayer TL1.

Conventionally, there are three syntax structures in the VPS that are defined generally and subsequently mapped to a specific OLS:
  Profile-tier-level (PTL), e.g. one or more decoder requirement sets
  DPB parameters, e.g. one or more buffer requirement sets
  HRD parameters, e.g. one or more bitstream conformance sets The mapping of PTL to OLSs is done in the VPS for all OLS (with single layer or with multilayer). However, the mapping for the DPB and HRD parameters to OLS is only done in the VPS for OLS with more than one layer. As illustrated in FIG. 12, the parameters for PTL, DPB and HRD are described in the VPS first and then OLSs are mapped to indicate which parameter they use.

In the example shown in FIG. 12 there are 2 OLS and 2 of each of these parameters. The definition and mapping has been however specified to allow more than one OLS to share the same parameters and thus not require repeating the same information multiple times, as for instance illustrated in FIG. 13.

FIG. 13 illustrates an example where OLS2 and OLS3 have the same PTL and DBP parameters but different HRD parameters.

In the examples of FIG. 12 and FIG. 13, the values of vps_ptl_max_temporal_id[i], vps_dpb_max_temporal_id [i], vps_hrd_max_tid[i] for a given OLS are aligned (TL0 for OLS1, TL1 for OLS2, TL1 for OLS2), but this is currently not necessary. These three values that are associated to the same OLS are not currently restricted to have the same value. Currently, none of these values is constraint in any manner to be consistent or match the number of sublayers in a bitstream. For instance, in the example above, the bitstream could have a single sublayer for OLS 2 and 3 although values are defined for two sublayers. Therefore, a decoder would not find it easily what are the characteristics of the bitstream as the matching becomes more complicated.

In a first embodiment, the bitstream signals the maximum number of sublayers that are present in an OLS (not necessarily the bitstream as some might have been dropped), but at least it can be understood as an upper bound, i.e. no more sublayers can be present for a OLS in the bitstream than the signal value, e.g. vps_ptl_max_temporal_id [i]. Thus, also DPB and HRD parameters are used by the decoder.

If the values of vps_dpb_max_temporal_id[i], vps_hrd_max_tid[i] are different to vps_ptl_max_temporal_id [i] the decoders would need to carry out a more complicated mapping. Therefore, in one embodiment there is a bitstream constraint that if a OLS indexes a PTL structure, DPB structure and HRD parameters structure with vps_ptl_max_temporal_id[i], vps_dpb_max_temporal_id[i], vps_hrd_max_tid[i] respectively, vps_dpb_max_temporal_id[i], vps_hrd_max_tid[i] shall be equal to vps_ptl_max_temporal_id[i].

According to an embodiment, the encoder 10, e.g. the encoder 10 of FIG. 1 or FIG. 11, is configured for forming the OLS indication 18 such that the maximum temporal sublayers indicated by the bitstream conformance set 86, the buffer requirement set 84, and the decoder requirement set 82 associated with the OLS are equal to each other, and parameters within the bitstream conformance set 86, the buffer requirement set 84, and the decoder requirement set 82 are valid for the OLS completely.

However, looking at the example in FIG. 12, the parameters for OLS1 having a single sublayer (TL0), i.e. the level 0 (L0 (TL0) in PTL0) DPB parameters 0 (DPB0 in DPB 0) and HRD parameters 0 (HRD0 in HRD 0) are also described in PTL 1 $82_2$, DPB 1 $84_2$ and HRD 1 $86_2$. In order to not repeat so many parameters, one option would be to not include DPB 0 $84_1$ and HRD 0 $86_1$, and take the values for OLS1 from DPB parameters and HRD parameters that include more sublayers. An example is illustrated in FIG. 14.

FIG. 14 illustrates an example of PTL, DPB and HRD definition and sharing among different OLS with sublayer information irrelevant for some OLSs. Since PTL0 indicates that there is only one sublayer only the parameters for TL0 of DPB1 and HRD1 would be used.

Therefore, in another embodiment there is a bitstream constraint that if a OLS indexes a PTL structure, DPB structure and HRD parameters structure with vps_ptl_max_temporal_id[i], vps_dpb_max_temporal_id[i], vps_hrd_max_tid[i] respectively, vps_dpb_max_temporal_id[i], vps_hrd_max_tid[i] shall be greater than or equal to vps_ptl_max_temporal_id[i] and greater values corresponding to higher sublayers for DPB and HRD parameters are ignored for the OLS.

Accordingly, according to a further embodiment, the encoder 10 is configured for forming the OLS indication 18 and/or the video parameter set 81 (or, in general, the multi-layered video bitstream 14) such that the maximum temporal sublayer indicated by the decoder requirement set 82 associated with the OLS is smaller than or equal to the maximum temporal sublayer indicated by each of the buffer requirement sets 84 and the bitstream conformance set 86 associated with the OLS, and the parameters within the buffer requirement set 84 and the bitstream conformance set 86 are valid for the OLS only as far as same relate to temporal layers equal to and beneath the maximum temporal sublayer indicated by the decoder requirement set 82 associated with the OLS.

In other words, the encoder 10 may provide the OLS indication 18 and/or the video parameter set 81 so that the maximum temporal sublayer indicated by the buffer requirement set 84 associated with the OLS is greater than or equal to the maximum temporal sublayer indicated by the decoder requirement set 82 associated with the OLS and so that the maximum temporal sublayer indicated by the bitstream conformance set 86 associated with the OLS is greater than or equal to the maximum temporal sublayer indicated by the decoder requirement set 82 associated with the OLS.

For example, FIG. 14 illustrates an example of a video parameter set 81 comprising a first decoder requirement set $82_1$ for a first set of layers, e.g. layer L0, comprising access units of a first temporal sublayer, TL0. The video parameter set 81 further comprises a second decoder requirement set $82_2$ referring to a second set of layers, the second set of layers comprising layer L0 and layer L1, the second set of layers including access units of the first temporal sublayer and a second temporal sublayer, i.e. TL0 and TL1. Thus, the maximum temporal sublayer of the second set of layers is the second temporal sublayer TL1. The video parameter set 81 further comprises a DPB parameter set $84_2$ referring to the second set of layers, a bitstream conformance set $86_2$ referring to the second set of layers, and a bitstream conformance set $86_3$ which refers to a third set of layers comprising access units of the first temporal sublayer and a third layer, L2, having access units of the second temporal sublayer. A first OLS, OLS1, is associated with the first set of layers, the decoder requirements of which are described by the first decoder requirement set $82_1$ indicating a maximum temporal sublayer of the first set of layers being the first temporal sublayer. As the first temporal sublayer is smaller than or equal to (note that the temporal sublayers are hierarchically ordered) than the maximum temporal sublayers indicated by the DPB parameter set $84_2$ which is associated to OLS1, and the bitstream conformance set $86_2$ which is associated with OLS1, the DPB parameter set $84_2$ and the bitstream conformance set $86_2$ comprise information about the first set of layers. Thus, the DPB parameter set $84_2$ and the bitstream conformance set $86_2$ are valid for OLS1 as far as they relate to the first set of layers, the access units of which belong to the first temporal sublayer. For example, as described with respect to FIG. 12, and also illustrated in FIG. 13 and FIG. 14, the decoder requirement set $82_2$, the buffer requirement set $84_2$, and the bitstream conformance set $86_2$ include sets of parameters for each of the temporal sublayers included in the bitstream to which they refer. According to this embodiment, the parameters relating to the first temporal sublayer TL0 are valid for OLS1, as the first temporal sublayer is equal to or smaller than the maximum temporal sublayer indicated by the decoder requirement set $82_2$.

In other words, decoder 50 may use, for the OLS to be decoded, those (and in examples only those) parameters of the decoder requirement set 82, the buffer requirement set 84, and the bitstream conformance set 86 associated with the OLS which relate to a temporal sublayer which is equal to or smaller than the maximum temporal sublayer associated with the decoder requirement set 82 for the OLS.

FIG. 15 illustrates another example of a video parameter set 81 and an OLS indication 18. FIG. 15 illustrates an alternative which may occur when the parameters for TL1 and TL0 are the same or when the values for TL1 are the maximum ones that are allowed for a level. In such a case, instead of not including DPB0 and HRD0 in the VPS as shown before, both could be included without including DPB1 and HRD1. Then the values for higher sublayers for OLS1 could be derived as being equal to those signaled for TL0 or to the maximum allowed by the level. Thus, FIG. 15 illustrates an example of PTL, DPB and HRD definition and sharing among different OLS with sublayer information needed to be inferred when not present for some OLSs.

Therefore, in another embodiment there is no bitstream constraint on the values vps_ptl_max_temporal_id[i], vps_dpb_max_temporal_id[i], vps_hrd_max_tid[i], but for values of vps_ptl_max_temporal_id[i] greater than vps_dpb_max_temporal_id[i], vps_hrd_max_tid[i] DPB and HRD parameters for i>vps_dpb_max_temporal_id[i], vps_hrd_max_tid[i] up to vps_ptl_max_temporal_id[i] shall be inferred to be a maximum value specified by the profile lever or equal to the highest signaled DPB and HRD parameters.

Accordingly, according to another embodiment, encoder 10 is configured for forming the OLS indication and/or the video parameter set 81 such that the maximum temporal sublayer indicated by the decoder requirement set 82 associated with the OLS is greater than or equal to the maximum temporal sublayer indicated by each of the buffer requirement set 84 and the bitstream conformance set 86 associated with the OLS. According to these embodiments, parameters missing within the buffer requirement set 84 and the bitstream conformance set 86 associated with the OLS, e.g. OLS 2 of FIG. 15, and relating to temporal sublayers above the maximum temporal sublayer indicated by each of the buffer requirement set 84 and the bitstream conformance set 86, are to be set equal to the fourth parameters or equal to parameters within the buffer requirement set 84 and the bitstream conformance set 86 associated with the OLS which relate to the maximum temporal sublayer indicated by each of the buffer requirement set 84 and the bitstream conformance set 86.

Accordingly, an embodiment of a decoder for decoding a multi-layered video bitstream, such as decoder 50 of FIG. 1 may be configured for inferring, if the maximum temporal sublayer indicated by the decoder requirement set 82 associated with the OLS is greater than or equal to the maximum temporal sublayer indicated by each of the buffer requirement set 84 and the bitstream conformance set 86 associated with the OLS, i.e. the OLS to be decoded, inferring that parameters associated with the OLS for the buffer requirement set 84 and the bitstream conformance set 86 related to temporal sublayers above the maximum temporal sublayer indicated by each of the buffer requirement set and the bitstream conformance set are to be set equal to, for each of the parameters for the buffer requirement set 84 and the bitstream conformance set 86 a default value such as a maximum value for the respective parameter indicated in the decoder requirement set 82, or a value for the respective parameter within the buffer requirement set 84 or the bitstream conformance set 86 associated with the OLS which relate to the maximum temporal sublayer indicated by each of the buffer requirement set 84 and the bitstream conformance set 86. For example, the choice whether the default value is to be used or whether the value for the respective parameter within the buffer requirement set or the bitstream conformance set relating to the maximum temporal sublayer indicated by each of the buffer requirement set and the bitstream conformance set may be made differently for each of the parameters of the buffer requirement set 84 and the bitstream conformance set 86.

7. Output Layer Selection in Region of Interest Applications

Section 7 describes embodiments according to the seventh aspect making reference to FIG. 1. Thus, the description of FIG. 1 may optionally apply to the embodiments in accordance with the seventh aspect. Also details described with respect to the further aspects may optionally be implemented in embodiments described in this section.

Some embodiments according to the seventh aspect relate to PicOutputFlag derivation in RoI applications.

When a multi layer bitstream, such as video bitstream 14, is used and pictures of the designated output layers are not available on decoder side (e.g. bitstream error or transmission loss), it may result in suboptimal user experience when certain considerations are not obeyed. Usually, when an access unit does not contain pictures in the output layer, it is up to the implementation to select pictures from non-output layers for output as to compensate for the error/loss as evident from the following note below the derivation of the PicOutputFlag variable:

The variable PictureOutputFlag of the current picture is derived as follows:
If sps_video_parameter_set_id is greater than 0 and the current layer is not an output layer (i.e., nuh_layer_id is not equal to OutputLayerIdInOls[TargetOlsIdx][i] for any value of i in the range of 0 to NumOutput- LayersInOls[TargetOlsIdx]−1, inclusive), or one of the following conditions is true, PictureOutputFlag is set equal to 0:
  The current picture is a RASL picture and NoOutputBeforeRecoveryFlag of the associated IRAP picture is equal to 1.
  The current picture is a GDR picture with NoOutputBeforeRecoveryFlag equal to 1 or is a recovering picture of a GDR picture with NoOutputBeforeRecoveryFlag equal to 1.
Otherwise, PictureOutputFlag is set equal to ph_pic_output_flag.
NOTE—In an implementation, the decoder could output a picture not belonging to an output layer. For example, when there is only one output layer while in an AU the picture of the output layer is not available, e.g., due to a loss or layer down-switching, the decoder could set PictureOutputFlag set equal to 1 for the picture that has the highest value of nuh_layer_id among all pictures of the AU available to the decoder and having ph_pic_output_flag equal to 1, and set PictureOutputFlag equal to 0 for all other pictures of the AU available to the decoder.

It is, however, undesirable to change between layers in the decoder output on short time frames when the bitstream is made for a region of interest (RoI) application, i.e. higher layers depict only a subset of the lower layer pictures (via the use of scaling window) as this would result in a very fast switching between overview and detail view. Therefore, as part of the invention, in one embodiment a decoder implementation is not permitted to freely select output layer when scaling windows are in use that do not cover the whole picture plane as follows:

In an implementation, the decoder could output a picture not belonging to an output layer as long as scaling windows cover the complete picture plane. For example, when there is only one output layer while in an AU the picture of the output layer is not available, e.g., due to a loss or layer down-switching, the decoder could set PictureOutputFlag set equal to 1 for the picture that has the highest value of nuh_layer_id among all pictures of the AU available to the decoder and having ph_pic_output_flag equal to 1, and set PictureOutputFlag equal to 0 for all other pictures of the AU available to the decoder.

According to an embodiment of the seventh aspect, the decoder 50 for decoding a multi-layered video bitstream, for example the multi-layered video bitstream 14 or the sub-bitstream 12, is configured for using vector-based interlayer prediction of predicted pictures $26_2$ of a first layer $24_2$ from reference pictures $26_1$ of a second layer $24_1$ with scaling and offsetting prediction vectors according to relative sizes and relative positions of scaling windows of the predicted pictures and the reference pictures which are defined in the multi-layered video bitstream 14. For example, picture $26_2$ of layer $24_2$ of FIG. 1 may be encoded into the multi-layered video data stream 14 using interlayer prediction from picture $26_1$ of layer $24_1$, e.g. the picture $26_1$ of the same access unit $22_1$. According to the seventh aspect, the multi-layered video bitstream 14 may comprise an OLS indication 18 of an OLS indicating a subset of layers of the multi-layered video bitstream 14, the OLS comprising one or more output layers including the first layer $24_1$ and one or more non-output layers including the second layer.

In case of a loss of a predetermined picture of the first layer $24_2$ of the OLS, such as picture $26_2$, decoder 50 according to the seventh aspect is configured for substituting the predetermined picture $26_2$ by a further predetermined picture of the second layer $24_1$ of the OLS which is in the same access unit 22 as the predetermined picture, in case of the scaling window defined for the predetermined picture $26_2$ coinciding with the picture boundary of the predetermined picture and the scaling window defined for the further predetermined picture coinciding with the picture boundary of the further predetermined picture. In case of at least one of the scaling pictures defined for the predetermined picture not coinciding with the picture boundary of the predetermined picture and the scaling window defined for the predetermined picture not coinciding with the picture boundary of the further predetermined picture, decoder 50 is configured for substituting the predetermined picture by other means or not at all.

8. Further Embodiments

In the previous sections, although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded image signal can be stored on a digital storage medium or can be transmitted on a transmission medium such as a wireless transmission medium or a wired transmission medium such as the Internet.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

In the foregoing Detailed Description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

The above described embodiments are merely illustrative for the principles of the present disclosure. It is understood that modifications and variations of the arrangements and the details described herein will be apparent to others skilled in the art. It is the intent, therefore, to be limited only by the scope of the pending patent claims and not by the specific details presented by way of description and explanation of the embodiments herein.

The invention claimed is:

1. A decoder for video bitstream decoding, the decoder comprising:
 a processor; and
 a memory storing instructions that, when executed by the processor, cause the processor to:
  obtain a video bitstream that includes access units, each of the access units including one or more pictures, and each of the one or more pictures correspond to one of a plurality of layers of the video bitstream,
  derive, from the video bitstream, one or more output layer sets (OLSs), each indicating a set of layers from the plurality of layers of the video bitstream,
  identify a first access unit of the access units,
  for the first access unit, when external information for identifying an OLS to be decoded among the one or more OLSs is not available, identify the OLS to be decoded based on a number of layers of each of the one or more OLSs, and
  decode the identified OLS.

2. The decoder according to claim 1, wherein to determine the OLS to be decoded, the instructions, when executed by the processor, cause the processor to identify a highest or lowest value beyond indices of each of the OLSs.

3. The decoder according to claim 1, wherein to determine the OLS to be decoded, the instructions, when executed by the processor, cause the processor, to identify a highest number of layers of the OLSs.

4. The decoder according to claim 1, wherein the external information is external to the video bitstream.

5. The decoder according to claim 1, wherein the instructions, when executed by the processor, further cause the processor to:
 obtain the external information that is separate from the video bitstream; and
 identify the OLS to be decoded based on the external information.

6. The decoder according to claim 1, wherein the instructions, when executed by the processor, further cause the processor to:
 determine whether additional information indicating an operational point is obtained;
 in response to obtaining the additional information, identify the operational point to decode; and
 in response to not obtaining the additional information, select the OLS to be decoded.

7. The decoder according to claim 1, wherein the first access unit is at a start of one of a coded video sequences and represents at least one of a first of a temporal order, a first in decoding order, or a first in an output order.

8. The decoder according to claim 1, wherein the first access unit is a sequence start access unit type.

9. The decoder according to claim 8, wherein the first access unit is at a start of the video bitstream.

10. A method for video bitstream decoding, the method comprising:
 obtaining a video bitstream that includes access units, each of the access units including one or more pictures, and each of the one or more pictures correspond to one of a plurality of layers of the video bitstream;
 deriving, from the video bitstream, one or more output layer sets (OLSs), each indicating a set of layers from the plurality of layers of the video bitstream;
 identifying a first access unit of the access units;

for the first access unit, when external information for identifying an OLS to be decoded among the one or more OLSs is not available, identifying the OLSs to be decoded based on a number of layers of each of the one or more OLSs; and decoding the identified OLS.

11. The method according to claim 10, wherein determining the OLS to be decoded comprises identifying a highest or lowest value beyond indices of each of the OLSs.

12. The method according to claim 10, wherein determining the OLS to be decoded comprises identifying a highest number of layers of the OLSs.

13. The method according to claim 10, wherein determining the OLS to be decoded is based on at least one of an index of each of the OLSs, a number of output layers of each of the OLSs, or the number of layers of each of the OLSs.

14. The method according to claim 10, further comprises:
obtaining the external information that is separate from the video bitstream; and
identifying the OLS to be decoded based on the external information.

15. The method according to claim 10, further comprising:
determining whether additional information indicating an operational point is obtained;
in response to obtaining the additional information, identifying the operational point to decode; and
in response to not obtaining the additional information, selecting the OLS to be decoded.

16. The method according to claim 10, wherein the first access unit is at a start of one of a coded video sequences and represents at least one of a first of a temporal order, a first in decoding order, or a first in an output order.

17. The method according to claim 10, wherein the first access unit is a sequence start access unit type.

18. The method according to claim 17, wherein the first access unit is at a start of the video bitstream.

19. A non-transitory computer readable medium storing a computer program, that when executed by a processor of a decoder causes the decoder to:
obtain a video bitstream that includes access units, each of the access units including one or more pictures, and each of the one or more pictures correspond to one of a plurality of layers of the video bitstream;
derive, from the video bitstream, one or more output layer sets (OLSs), each indicating a set of layers from the plurality of layers of the video bitstream;
identify a first access unit of the access units;
for the first access unit, when external information for identifying an OLS to be decoded among the one or more OLSs is not available, identify the OLSs to be decoded based on a number of layers of each of the one or more OLSs; and
decode the identified OLS.

* * * * *